US012798568B2

(12) United States Patent
Yeon et al.

(10) Patent No.: US 12,798,568 B2
(45) Date of Patent: Nov. 17, 2026

(54) METHOD, APPARATUS AND SYSTEM FOR DRIVING BY DETECTING OBJECTS AROUND THE VEHICLE

(71) Applicant: 42DOT INC., Seoul (KR)

(72) Inventors: Kyu Hwan Yeon, Suwon (KR); Hayoung Kim, Suwon (KR)

(73) Assignee: 42DOT INC., Seoul (KR)

( * ) Notice: Subject to any disclaimer, the term of this patent is extended or adjusted under 35 U.S.C. 154(b) by 55 days.

(21) Appl. No.: 18/364,439

(22) Filed: Aug. 2, 2023

(65) Prior Publication Data

US 2024/0109536 A1 Apr. 4, 2024

(30) Foreign Application Priority Data

Aug. 3, 2022 (KR) ........................ 10-2022-0096457
Sep. 28, 2022 (KR) ........................ 10-2022-0123725
Sep. 29, 2022 (KR) ........................ 10-2022-0124595

(51) Int. Cl.
*B60W 30/095* (2012.01)
*B60W 60/00* (2020.01)

(52) U.S. Cl.
CPC .... *B60W 30/0956* (2013.01); *B60W 60/0027* (2020.02); *B60W 2556/10* (2020.02); *B60W 2556/45* (2020.02)

(58) Field of Classification Search
None
See application file for complete search history.

(56) References Cited

U.S. PATENT DOCUMENTS

2018/0093668 A1 4/2018 Kim
2019/0023239 A1 1/2019 Fujita
(Continued)

FOREIGN PATENT DOCUMENTS

DE 10 2018 222 601 A1 6/2020
EP 3 598 414 A1 1/2020
(Continued)

OTHER PUBLICATIONS

The Office Action issued on Aug. 11, 2026, in the corresponding German application.

*Primary Examiner* — Hitesh Patel
*Assistant Examiner* — Wenyuan Yang
(74) *Attorney, Agent, or Firm* — Harvest IP Law, LLP

(57) ABSTRACT

Provided is a method of predicting a future trajectory of a current target vehicle by using pieces of movement information of one or more past nearby vehicles. In detail, the method includes receiving, by a server, the pieces of movement information about the one or more past nearby vehicles at a reference location of a past driving vehicle, obtaining, by the server, from the pieces of movement information, first state information about the one or more past nearby vehicles at a first time point, wherein the first time point corresponds to a previous time point before a reference time point, obtaining, by the server, from the pieces of movement information, movement locations of the one or more past nearby vehicles at a second time point at which a preset time period has elapsed from the first time point, and probabilistically calculating, by the server, distributions of the movement locations by using a clustering technique, wherein the distributions of the movement locations are used to predict the future trajectory of the current target vehicle.

10 Claims, 24 Drawing Sheets

(56) References Cited

U.S. PATENT DOCUMENTS

| | | | | |
|---|---|---|---|---|
| 2019/0171218 | A1 | 6/2019 | Hammond | |
| 2019/0204843 | A1 * | 7/2019 | Fang | B60W 30/0956 |
| 2019/0220014 | A1 | 7/2019 | Bradley | |
| 2019/0270405 | A1 | 9/2019 | Fukumoto | |
| 2020/0023835 | A1 * | 1/2020 | Hardå | B60Q 9/008 |
| 2020/0208991 | A1 * | 7/2020 | Chen | G01C 21/30 |
| 2020/0247434 | A1 | 8/2020 | Kim | |
| 2021/0064889 | A1 | 3/2021 | Iglesias | |
| 2021/0094577 | A1 | 4/2021 | Shalev-Shwartz | |
| 2021/0107532 | A1 * | 4/2021 | Zhao | B60W 30/12 |
| 2021/0295171 | A1 | 9/2021 | Kamenev | |
| 2022/0089152 | A1 | 3/2022 | Oh | |
| 2022/0410890 | A1 | 12/2022 | Takei | |
| 2023/0316910 | A1 | 10/2023 | Kim | |
| 2023/0399014 | A1 | 12/2023 | Mehdipour | |
| 2024/0013406 | A1 * | 1/2024 | Chen | G06V 20/64 |

FOREIGN PATENT DOCUMENTS

| | | | |
|---|---|---|---|
| JP | 2008-257652 | A | 10/2008 |
| JP | 2012-221164 | A | 11/2012 |
| JP | 2019-114042 | A | 7/2019 |
| KR | 10-2018-0075568 | A | 7/2018 |
| KR | 10-2020-0126441 | A | 11/2020 |
| KR | 10-2021-0050925 | A | 5/2021 |
| WO | 2021/181594 | A1 | 9/2021 |

* cited by examiner

METHOD, APPARATUS AND SYSTEM FOR DRIVING BY DETECTING OBJECTS AROUND THE VEHICLE

CROSS-REFERENCE TO RELATED APPLICATION

This application is based on and claims priority under 35 U.S.C. § 119 to Korean Patent Application No. 10-2022-0096457, filed on Aug. 3, 2022, in the Korean Intellectual Property Office, the disclosure of which is incorporated by reference herein in its entirety.

BACKGROUND

1. Field

The present disclosure relates to a method, device, and system for detecting objects around a vehicle for driving thereof.

2. Description of the Related Art

Along with the merging of information communication technology and the vehicle industry, smartization of vehicles is rapidly progressing. The smartization of vehicles enables the vehicles to evolve from simple mechanical devices to smart cars, and in particular, autonomous driving is attracting attention as a core technology of smart cars. Autonomous driving is a technology that allows a vehicle to reach its destination on its own without a driver manipulating the steering wheel, accelerator pedal, or brake.

Various additional functions related to autonomous driving have been continuously developed, and there is a continuous demand for research into a method of providing a safe autonomous driving environment to both a passenger and a pedestrian by controlling a vehicle based on recognition and determination of a driving environment using various types of data.

In particular, autonomous vehicles may need to predict future trajectories or movements of nearby vehicles for safe driving. Accordingly, there is a need to invent a method of predicting trajectories of nearby vehicles.

In addition, there is a need for information that may be used to predict movements of nearby vehicles.

The above-mentioned background art is technical information possessed by the inventor for the derivation of the present disclosure or acquired during the derivation of the present disclosure, and cannot necessarily be said to be a known technique disclosed to the general public prior to the filing of the present disclosure.

SUMMARY

Some embodiments according to the present disclosure provide a method, device, and system for detecting objects around a vehicle for driving thereof. Technical objectives of the present disclosure are not limited to the foregoing, and other unmentioned objectives or advantages of the present disclosure would be understood from the following description and be more clearly understood from the embodiments of the present disclosure. In addition, it would be appreciated that the objectives and advantages of the present disclosure may be implemented by means provided in the claims and a combination thereof.

Additional aspects will be set forth in part in the description which follows and, in part, will be apparent from the description, or may be learned by practice of the presented embodiments of the disclosure.

A first aspect of the present disclosure may provide a method of predicting a future trajectory of a current target vehicle by using pieces of movement information about one or more past nearby vehicles, the method including receiving, by a server, the pieces of movement information about the one or more past nearby vehicles at a reference location of a past driving vehicle, obtaining, by the server, from the pieces of movement information, first state information about the one or more past nearby vehicles at a first time point, wherein the first time point corresponds to a previous time point before a reference time point, obtaining, by the server, from the pieces of movement information, movement locations of the one or more past nearby vehicles at a second time point at which a preset time period has elapsed from the first time point, and probabilistically calculating, by the server, distributions of the movement locations by using a clustering technique, wherein the distributions of the movement locations are used to predict the future trajectory of the current target vehicle.

Here, the method may further include receiving second state information about the current target vehicle at the reference location and the reference time point, and selecting, from among the distributions of the movement locations of the one or more past nearby vehicles, the distribution of the movement locations that matches the second state information about the current target vehicle.

Here, the selected distribution of the movement locations may be used to estimate a distribution of target locations of the current target vehicle at a third time point, wherein the third time point corresponds to a future time point at which the preset time period has elapsed from the reference time point, and the distribution of the target locations may be used to predict the future trajectory of the current target vehicle.

Here, the first state information about the one or more past nearby vehicles and the second state information about the current target vehicle may include location values and speed values of the respective vehicles.

Here, the selecting of the distribution of the movement locations that matches the second state information may include receiving the location value and the speed value of the current target vehicle, extracting, from the first state information, the location values of the one or more past nearby vehicles within a preset range from the location value of the current target vehicle, selecting the one or more past nearby vehicles having speed values within a preset range from the speed value of the current target vehicle, from among the one or more past nearby vehicles having the location value of the current target vehicle, and selecting distributions of movement locations of the selected one or more past nearby vehicles at the second time point.

Here, the movement locations may be specified by at least one of a road on which the one or more past nearby vehicles were driving at the second time point, and a lane included in the road.

Here, the probabilistically calculating of the distributions of the movement locations may include generating one or more clusters of the movement locations by using a clustering technique, approximating each of the one or more clusters as a Gaussian distribution, and obtaining a Gaussian mixture distribution of the movement locations by applying a Gaussian mixture model (GMM) to the one or more clusters approximated as the Gaussian distributions.

Here, the clustering technique may be density-based spatial clustering of applications with noise (DBSCAN).

A second aspect of the present disclosure may provide a server for predicting a future trajectory of a current target vehicle by using pieces of movement information about one or more past nearby vehicles, the server including a memory storing at least one program, and at least one processor configured to execute the at least one program to receive the pieces of movement information about the one or more past nearby vehicles at a reference location of a past driving vehicle, obtain, from the pieces of movement information, first state information about the one or more past nearby vehicles at a first time point, wherein the first time point corresponds to a previous time point before a reference time point, obtain, from the pieces of movement information, movement locations of the one or more past nearby vehicles at a second time point at which a preset time period has elapsed from the first time point, and probabilistically calculate distributions of the movement locations by using a clustering technique, wherein the distributions of the movement locations are used to predict the future trajectory of the current target vehicle.

A third aspect of the present disclosure may provide a system for predicting a future trajectory of a current target vehicle by using pieces of movement information about one or more past nearby vehicles, the system including a device in a past driving vehicle, the device being configured to receive the pieces of movement information about the one or more past nearby vehicles at a reference location of the past driving vehicle, a server configured to probabilistically calculate distributions of movement locations of the one or more past nearby vehicles by using the pieces of movement information, and a device in a current driving vehicle, the device being configured to predict the future trajectory of the current target vehicle by using the distributions of the movement locations, wherein the device in the current driving vehicle is further configured to obtain second state information about the current target vehicle at the reference location and a reference time point, receive, from the server, the distribution of the movement locations of the one or more past nearby vehicles that matches the second state information about the current target vehicle, estimate a distribution of target locations of the current target vehicle at a third time point by using the distributions of the movement locations wherein the third time point corresponds to a future time point at which the preset time period has elapsed from the reference time point, and predict the future trajectory of the current target vehicle by using the distribution of the target locations.

Here, the device in the current driving vehicle may be further configured to obtain a Gaussian mixture distribution of the target locations, and calculate an average point of the Gaussian mixture distribution, and a probability for each cluster included in the Gaussian mixture distribution.

A fourth aspect of the present disclosure may provide a method of determining a behavior of an autonomous vehicle planning to turn right to merge into a main road, the method including obtaining a collision lane that may overlap a driving path of the autonomous vehicle, among lanes included in the main road, identifying one or more candidate vehicles that are likely to collide with the autonomous vehicle, from among vehicles driving in the collision lane, predicting whether the candidate vehicle will occupy a preset collision area within a preset time period by predicting a path of the candidate vehicle, and determining an action of the autonomous vehicle planning to turn right, based on a result of prediction of occupancy and the current driving state of the autonomous vehicle.

Here, the method may further include setting the collision area based on the driving path of the autonomous vehicle and the collision lane.

Here, the determining of the action of the autonomous vehicle may include, when the current driving state is a first state of entering an action determination area that is within a preset distance from the collision area, determining the action of the autonomous vehicle to slowly drive in the action determination area.

Here, the determining of the action of the autonomous vehicle may include, when the current driving state is the first state and no pedestrians are identified, determining the action of the autonomous vehicle to slowly drive at a first threshold speed or less in the action determination area.

Here, the determining of the action of the autonomous vehicle may include, when the current driving state is the first state and a pedestrian is identified, determining the action of the autonomous vehicle to slowly drive at a second threshold speed or less in the action determination area, wherein the value of the first threshold speed may be greater than the value of the second threshold speed.

Here, the determining of the action of the autonomous vehicle may include, when the current driving state is a second state of slowly driving in the action determination area and the candidate vehicle is predicted to occupy the collision area, determining the action of the autonomous vehicle not to pass through the collision area for a certain time period by stopping the autonomous vehicle in the action determination area.

Here, the determining of the action of the autonomous vehicle may include, when the current driving state is the second state of slowly driving in the action determination area and the candidate vehicle is predicted not to occupy the collision area, determining the action of the autonomous vehicle to pass through the collision area by turning right into the main road.

Here, the determining of the action of the autonomous vehicle may include, when the current driving state is a third state of stopping in the action determination area and the candidate vehicle is predicted not to occupy the collision area, determining the action of the autonomous vehicle to slowly drive in the action determination area.

Here, the determining of the action of the autonomous vehicle may include, when the current driving state is the third state of stopping in the action determination area and the candidate vehicle is predicted to occupy the collision area, determining the action of the autonomous vehicle to maintain the stoppage in the action determination area.

A fifth aspect of the present disclosure may provide a device for determining a behavior of an autonomous vehicle planning to turn right to merge into a main road, the device including a memory storing at least one program, and at least one processor configured to execute the at least one program to overlap a driving path of the autonomous vehicle, among lanes included in the main road, identify one or more candidate vehicles that are likely to collide with the autonomous vehicle, from among vehicles driving in the collision lane, predict whether the candidate vehicle will occupy a preset collision area within a preset time period by predicting a path of the candidate vehicle, and determine an action of the autonomous vehicle planning to turn right, based on a result of prediction of occupancy and the current driving state of the autonomous vehicle.

A sixth aspect of the present disclosure may provide a computer-readable recording medium having recorded thereon a program for executing the method according to the first aspect or the method according to the fourth aspect, on a computer.

In addition, other methods and systems for implementing the present disclosure, and a computer-readable recording medium having recorded thereon a computer program for executing the methods may be further provided.

Other aspects, features, advantages other than those described above will become apparent from the following drawings, claims, and detailed description of the present disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
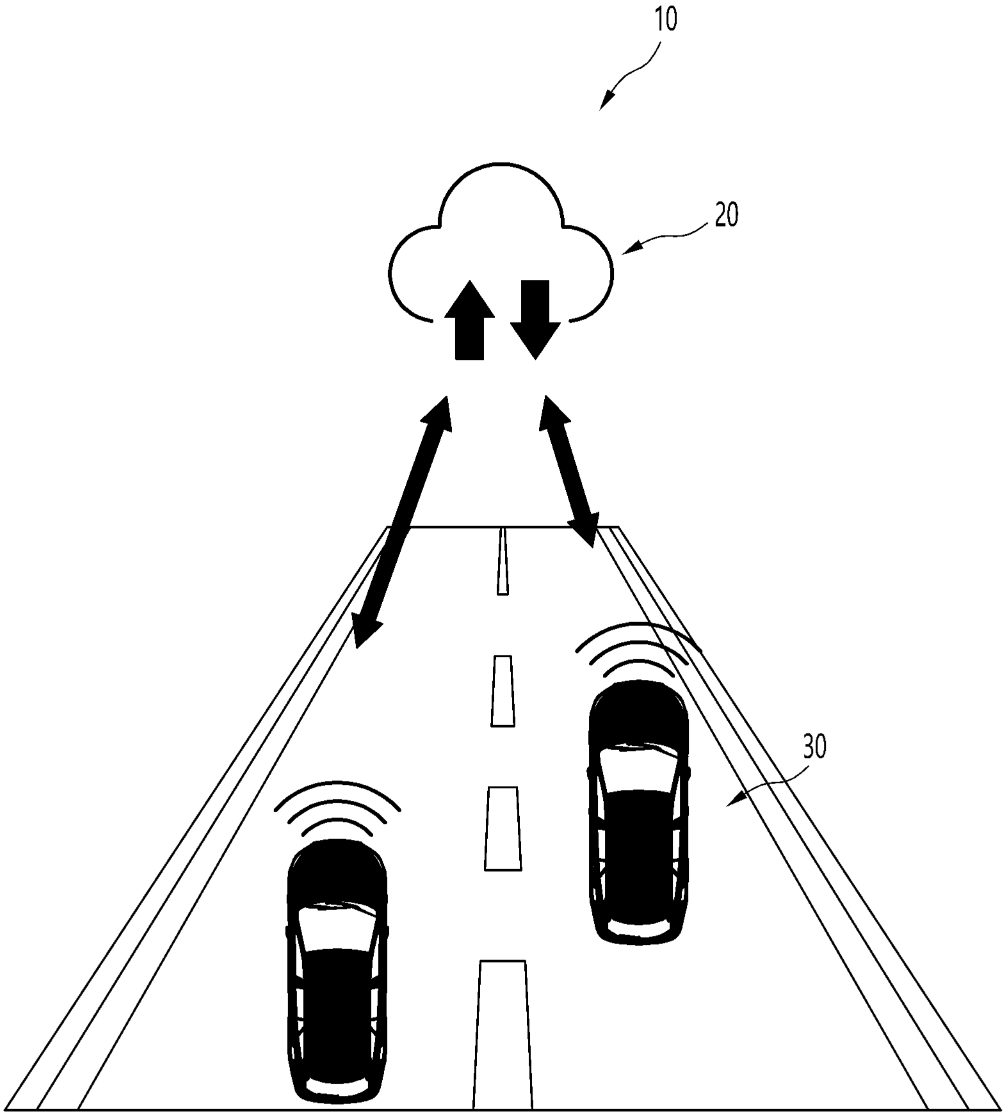
FIG. 1 is a diagram for describing an example of an autonomous driving system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Advantages and features of the present disclosure and a method for achieving them will be apparent with reference to embodiments of the present disclosure described below together with the attached drawings. The present disclosure may, however, be embodied in many different forms and should not be construed as being limited to the embodiments set forth herein, and all changes, equivalents, and substitutes that do not depart from the spirit and technical scope of the present disclosure are encompassed in the present disclosure. These embodiments are provided such that the present disclosure will be thorough and complete, and will fully convey the concept of the present disclosure to those of skill in the art. In describing the present disclosure, detailed explanations of the related art are omitted when it is deemed that they may unnecessarily obscure the gist of the present disclosure.

Terms used herein are for describing particular embodiments and are not intended to limit the scope of the present disclosure. Singular forms are intended to include plural forms as well, unless the context clearly indicates otherwise. As used herein, terms such as "comprises," "includes," or "has" specify the presence of stated features, numbers, stages, operations, components, parts, or a combination thereof, but do not preclude the presence or addition of one or more other features, numbers, stages, operations, components, parts, or a combination thereof.

Some embodiments of the present disclosure may be represented by functional block components and various processing operations. Some or all of the functional blocks may be implemented by any number of hardware and/or software elements that perform particular functions. For example, the functional blocks of the present disclosure may be embodied by at least one microprocessor or by circuit components for a certain function. In addition, for example, the functional blocks of the present disclosure may be implemented by using various programming or scripting languages. The functional blocks may be implemented by using various algorithms executable by one or more processors. Furthermore, the present disclosure may employ known technologies for electronic settings, signal processing, and/or data processing. Terms such as "mechanism", "element", "unit", or "component" may be used in a broad sense and are not limited to mechanical or physical components.

In addition, connection lines or connection members between components illustrated in the drawings are merely exemplary of functional connections and/or physical or circuit connections. Various alternative or additional functional connections, physical connections, or circuit connections between components may be present in a practical device.

Hereinafter, the term 'vehicle' may refer to all types of transportation instruments with engines that are used to move passengers or goods, such as cars, buses, motorcycles, kick scooters, or trucks.

Hereinafter, the present disclosure will be described in detail with reference to the accompanying drawings.

FIG. 1 is a diagram for describing an example of an autonomous driving system according to an embodiment.

Referring to FIG. 1, a system 10 may include a server 20 and one or more in-vehicle devices 30. For example, the server 20 and the in-vehicle device 30 may be connected to each other by a wired or wireless communication method to transmit and/or receive data (e.g., image data) to and/or from each other.

For convenience of description, FIG. 1 illustrates that the system 10 includes the server 20 and the in-vehicle devices 30, but the present disclosure is not limited thereto. For example, other external devices (not shown) may be included in the system 10, and operations of the server 20 and the in-vehicle device 30 to be described below may be implemented by a single device (e.g., the server 20 or the in-vehicle device 30) or more devices.

The server 20 may be a device that communicates with an external device (not shown) including the in-vehicle device 30. For example, the server 20 may be a device that stores various pieces of data including image data obtained by the in-vehicle device 30. Alternatively, the server 20 may be a computing device including a memory and a processor, and having an operation capability. In a case where the server 20 is a computing device, the server 20 may perform at least some of operations of the in-vehicle device 30 to be described below. For example, the server 20 may also be a cloud server, but is not limited thereto.

Meanwhile, for example, the in-vehicle device 30 may be an electronic device embedded in a vehicle. For example, the in-vehicle device 30 may be an electronic device that is manufactured and then inserted into a vehicle through tuning. For example, the in-vehicle device 30 may be an autonomous driving device mounted on a vehicle to implement an autonomous vehicle.

As another example, the in-vehicle device 30 may be a mobile electronic device. For example, the in-vehicle device 30 may be implemented as a smart phone, a tablet personal computer (PC), a PC, a smart television (TV), a personal digital assistant (PDA), a laptop computer, a media player, a navigation system, a camera-equipped device, and other mobile electronic devices. In addition, the in-vehicle device 30 may be implemented as a wearable device having a communication function and a data processing function, such as a watch, glasses, a hair band, a ring, or the like.

Figure 2A:
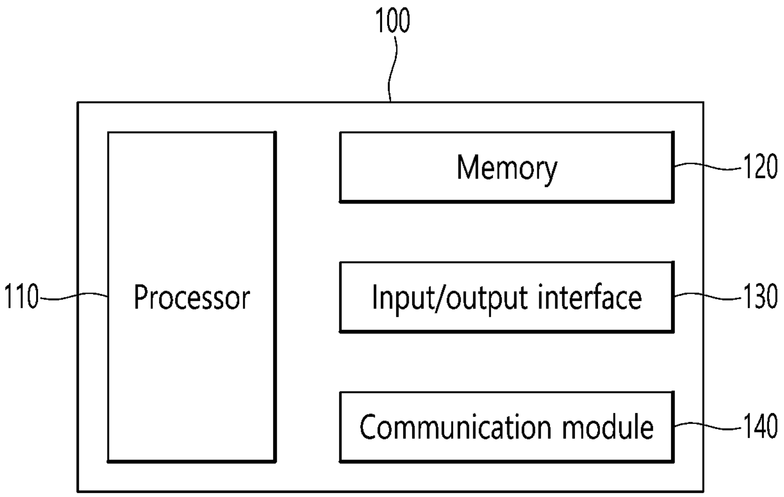
FIG. 2A is a block diagram for describing an internal configuration of a device according to an embodiment.

FIG. 2A is a block diagram for describing an internal configuration of a device according to an embodiment.

Referring to FIG. 2A, an in-vehicle device 100 may include a processor 110, a memory 120, an input/output interface 130, and a communication module 140. For convenience of description, FIG. 2A illustrates only components related to the present disclosure. Accordingly, other general-purpose components other than those illustrated in FIG. 2A may be further included in the in-vehicle device 100. In addition, it is obvious to those of skill in the art related to the present disclosure that the processor 110, the memory 120, the input/output interface 130, and the communication module 140 illustrated in FIG. 2A may also be implemented as independent devices.

The processor 110 may process commands of a computer program by performing basic arithmetic, logic, and input/output operations. Here, the commands may be provided from the memory 120 or an external device (e.g., the server 20). In addition, the processor 110 may control the overall operation of other components included in the in-vehicle device 100.

The processor 110 may be implemented as an array of a plurality of logic gates, or may be implemented as a combination of a general-purpose microprocessor and a memory storing a program executable by the microprocessor. For example, the processor 110 may include a general-purpose processor, a central processing unit (CPU), a microprocessor, a digital signal processor (DSP), a controller, a microcontroller, a state machine, etc. In some environments, the processor 110 may include an application-specific integrated circuit (ASIC), a programmable logic device (PLD), a field-programmable gate array (FPGA), etc. For example, processor 110 may refer to a combination of processing devices, such as a combination of a DSP and a microprocessor, a combination of a plurality of microprocessors, a combination of one or more microprocessors combined with a DSP core, or a combination of any other such configurations.

The memory 120 may include any non-transitory computer-readable recording medium. For example, the memory 120 may include a permanent mass storage device, such as random-access memory (RAM), read-only memory (ROM), a disk drive, a solid-state drive (SSD), or flash memory. As another example, the permanent mass storage device, such as ROM, an SSD, flash memory, or a disk drive, may be a permanent storage device separate from the memory. In addition, the memory 120 may store an operating system (OS) and at least one piece of program code (e.g., code for the processor 110 to perform an operation to be described below as being performed by the in-vehicle device 100).

These software components may be loaded from a computer-readable recording medium separate from the memory 120. The separate computer-readable recording medium may be a recording medium that may be directly connected to the in-vehicle device 100, and may include, for example, a computer-readable recording medium, such as a floppy drive, a disk, a tape, a digital video disc (DVD)/compact disc ROM (CD-ROM) drive, or a memory card. Alternatively, the software components may be loaded into the memory 120 through the communication module 140 rather than a computer-readable recording medium. For example, at least one program may be loaded into the memory 120 on the basis of a computer program (e.g., a computer program for the processor 110 to perform an operation to be described below as being performed by the in-vehicle device 100) installed by files provided via the communication module 140 by developers or a file distribution system that distributes installation files of applications.

The input/output interface 130 may be a unit for an interface with a device (e.g., a keyboard or a mouse) for input or output, which may be connected to or included in the in-vehicle device 100. Although FIG. 2A illustrates that the input/output interface 130 is a component implemented separately from the processor 110, the present disclosure is not limited thereto, and the input/output interface 130 may be implemented to be included in the processor 110.

The communication module 140 may provide a configuration or function for an external device (e.g., the server 20) and the in-vehicle device 100 to communicate with each other through a network. In addition, the communication module 140 may provide a configuration or function for the in-vehicle device 100 to communicate with another external device. For example, a control signal, a command, data, and the like provided under control by the processor 110 may be transmitted to the server 20 and/or an external device through the communication module 140 and a network.

Meanwhile, although not illustrated in FIG. 2A, the in-vehicle device 100 may further include a display device. Alternatively, the in-vehicle device 100 may be connected to an independent display device by a wired or wireless communication method to transmit and receive data to and from the display device.

Figure 2B:
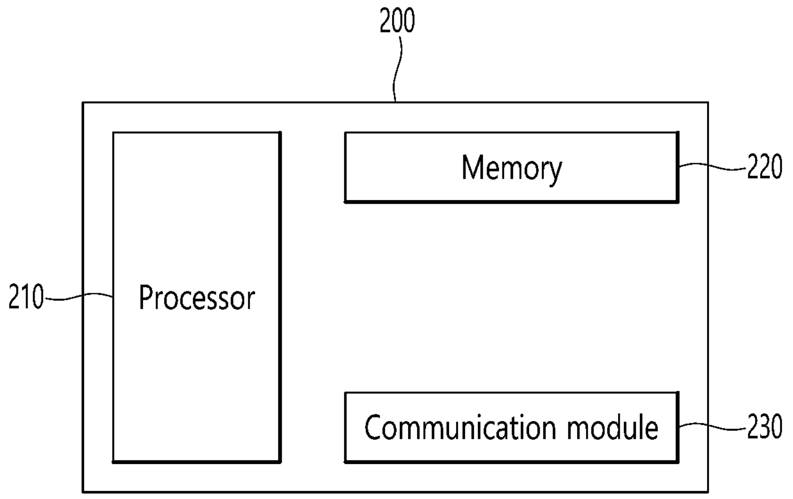
FIG. 2B is a block diagram for describing an internal configuration of a server according to an embodiment.

FIG. 2B is a block diagram for describing an internal configuration of a server according to an embodiment.

Referring to FIG. 2B, a server 200 includes a processor 210, a memory 220, and a communication module 230. For convenience of description, FIG. 2B illustrates only components related to the present disclosure. Accordingly, other general-purpose components other than those illustrated in FIG. 2B may be further included in the server 200. In addition, it is obvious to those of skill in the art related to the present disclosure that the processor 210, the memory 220, and the communication module 230 illustrated in FIG. 2B may also be implemented as independent devices.

According to an embodiment, at least one of operations of the processor 110 of the in-vehicle device 100 to be described below may be performed by the processor 210 of the server 200. In this case, the in-vehicle device 100 may output, through the display device, information transmitted from the server 200.

Meanwhile, an implementation example of the processor 210 is the same as that of the processor 110 described above with reference to FIG. 2A, and thus, detailed descriptions thereof will be omitted.

The memory 220 may store various pieces of data, such as image data obtained by the in-vehicle device 100. In addition, the memory 220 may store an OS and at least one program (e.g., a program required for the processor 210 to operate).

Meanwhile, an implementation example of the memory 220 is the same as that of the memory 120 described above with reference to FIG. 2A, and thus, detailed descriptions thereof will be omitted.

The communication module 230 may provide a configuration or function for the server 200 and one or more in-vehicle devices 100 to communicate with each other through a network. In addition, the communication module 230 may provide a configuration or function for the server 200 to communicate with another external device. For example, a control signal, a command, data, and the like provided under control by the processor 210 may be transmitted to the in-vehicle device 100 and/or an external device through the communication module 230 and a network.

Figure 3:
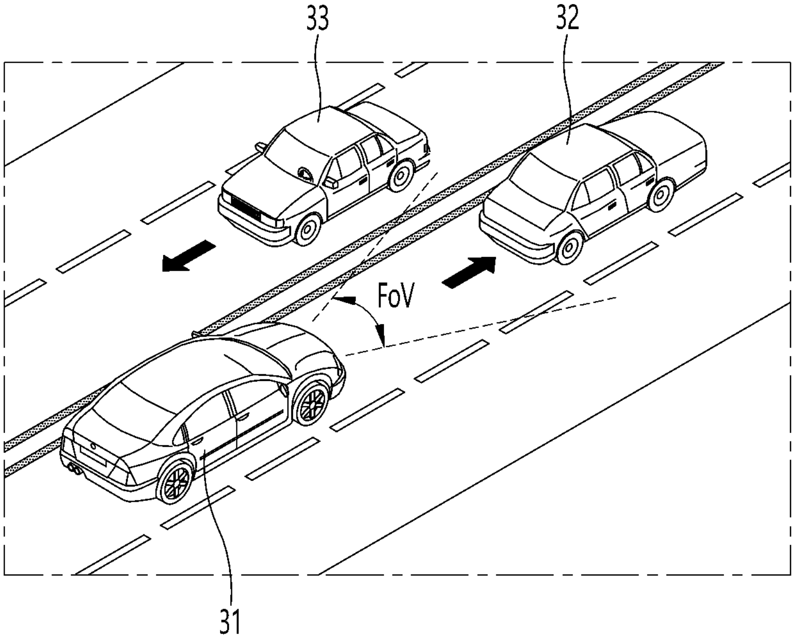
FIGS. 3 to 5 are diagrams for describing an autonomous driving method according to an embodiment.

FIG. 3 is a diagram for describing an autonomous driving method according to an embodiment.

Referring to FIG. 3, the in-vehicle device 30 according to an embodiment of the present disclosure may be mounted on a vehicle to implement an autonomous vehicle 31. For example, the in-vehicle device 30 mounted on the autonomous vehicle 31 may be an autonomous driving device. The autonomous driving device mounted on the autonomous vehicle 31 may include various sensors configured to collect situational information around the autonomous vehicle 31. For example, the autonomous driving device may detect a movement of a preceding vehicle 32 traveling in front of the autonomous vehicle 31, through an image sensor and/or an event sensor mounted on the front side of the autonomous vehicle 31. The autonomous driving device may further include sensors configured to detect, in addition to the preceding vehicle 32 traveling in front of the autonomous vehicle 31, another traveling vehicle 33 traveling in an adjacent lane, and pedestrians around the autonomous vehicle 31.

At least one of the sensors configured to collect the situational information around the autonomous vehicle may have a certain field of view (FoV) as illustrated in FIG. 3. For example, in a case where a sensor mounted on the front side of the autonomous vehicle 31 has a FoV as illustrated in FIG. 3, information detected from the center of the sensor may have a relatively high importance. This may be because most of information corresponding to the movement of the preceding vehicle 32 is included in the information detected from the center of the sensor.

The autonomous driving device may control a movement of the autonomous vehicle 31 by processing information collected by the sensors of the autonomous vehicle 31 in real time, while storing, in a memory device, at least part of the information collected by the sensors.

Figure 4:
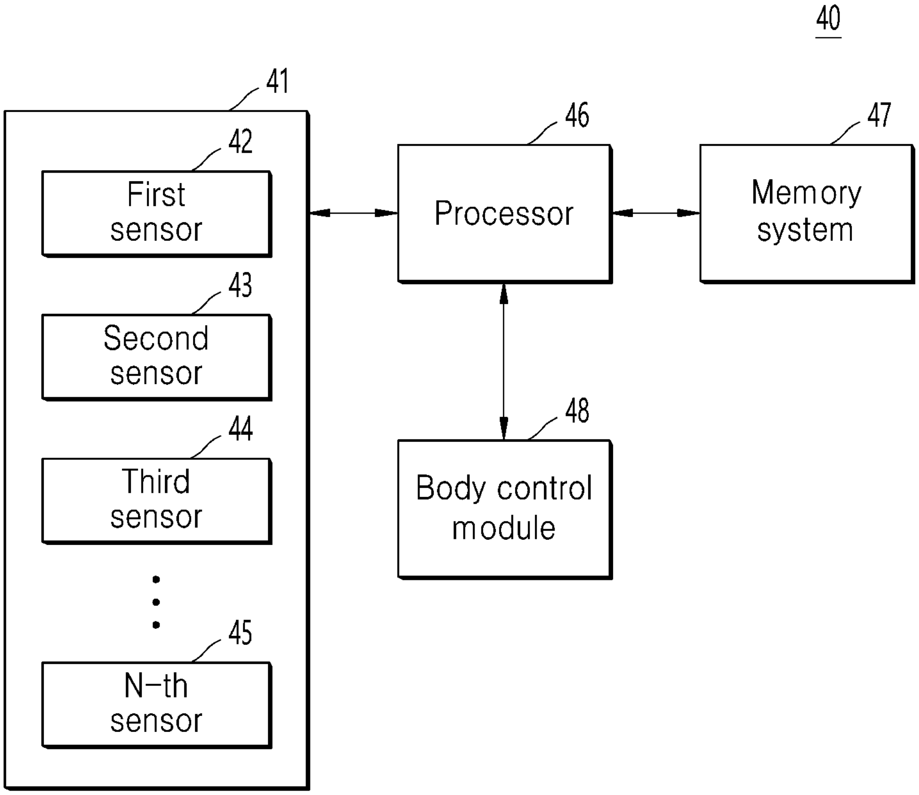

FIG. 4 is a block diagram illustrating hardware included in an in-vehicle device according to an embodiment.

Referring to FIG. 4, an in-vehicle device 40 may include a sensor unit 41, a processor 46, a memory system 47, a body control module 48, and the like. The sensor unit 41 may include a plurality of sensors 42 to 45, and the plurality of sensors 42 to 45 may include an image sensor, an event sensor, an illuminance sensor, a global positioning system (GPS) device, an acceleration sensor, and the like.

Data collected by the sensors 42 to 45 may be delivered to the processor 46. The processor 46 may store, in the memory system 47, the data collected by the sensors 42 to 45, and control the body control module 48 based on the data collected by the sensors 42 to 45 to determine a movement of the vehicle. The memory system 47 may include two or more memory devices and a system controller configured to control the memory devices. Each of the memory devices may be provided as a single semiconductor chip.

In addition to the system controller of the memory system 47, each of the memory devices included in the memory system 47 may include a memory controller, which may include an artificial intelligence (AI) computation circuit such as a neural network. The memory controller may generate computational data by applying certain weights to data received from the sensors 42 to 45 or the processor 46, and store the computational data in a memory chip.

Figure 5:
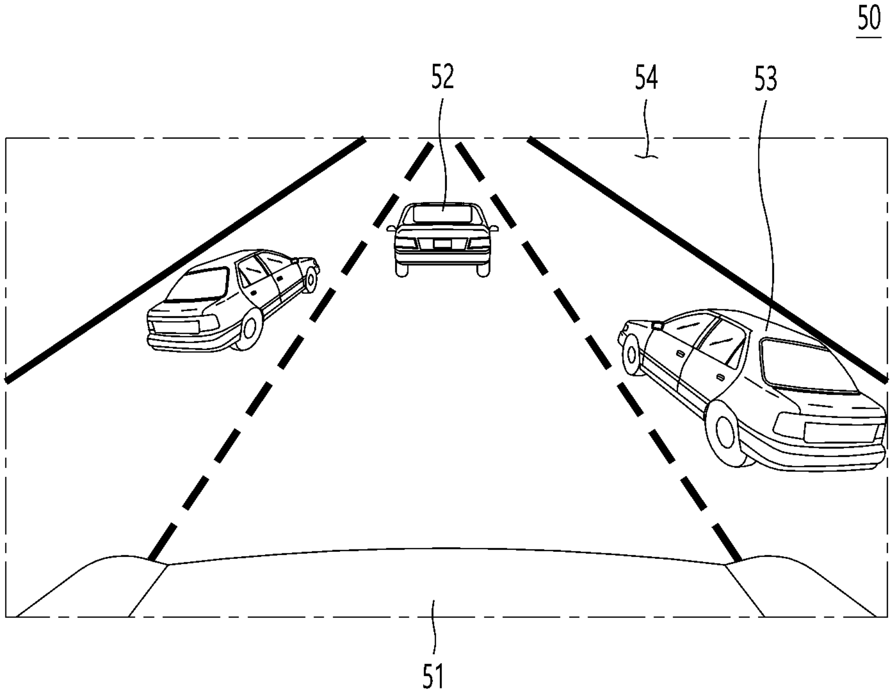

FIG. 5 is a diagram illustrating an example of image data obtained by sensors (including cameras) of an autonomous vehicle on which an autonomous driving device is mounted, according to an embodiment.

Referring to FIG. 5, image data 50 may be data obtained by a sensor mounted on the front side of the autonomous vehicle. Thus, the image data 50 may include a front area 51 of the autonomous vehicle, a preceding vehicle 52 traveling in the same lane as the autonomous vehicle, a traveling vehicle 53 around the autonomous vehicle, a background 54, and the like.

In the image data 50 according to the embodiment illustrated in FIG. 5, data regarding a region including the front area 51 of the autonomous vehicle and the background 54 may be unlikely to affect the driving of the autonomous vehicle. In other words, the front area 51 of the autonomous vehicle and the background 54 may be regarded as data having a relatively low importance.

On the other hand, the distance to the preceding vehicle 52 and a movement of the traveling vehicle 53 to change lanes or the like may be significantly important factors in terms of safe driving of the autonomous vehicle. Accordingly, data regarding a region including the preceding vehicle 52 and the traveling vehicle 53 in the image data 50 may have a relatively high importance in terms of the driving of the autonomous vehicle.

A memory device of the autonomous driving device may apply different weights to different regions of the image data 50 received from a sensor, and then store the image data 50. For example, a high weight may be applied to the data regarding the region including the preceding vehicle 52 and the traveling vehicle 53, and a low weight may be applied to the data regarding the region including the front area 51 of the autonomous vehicle and the background 54.

Figure 6:
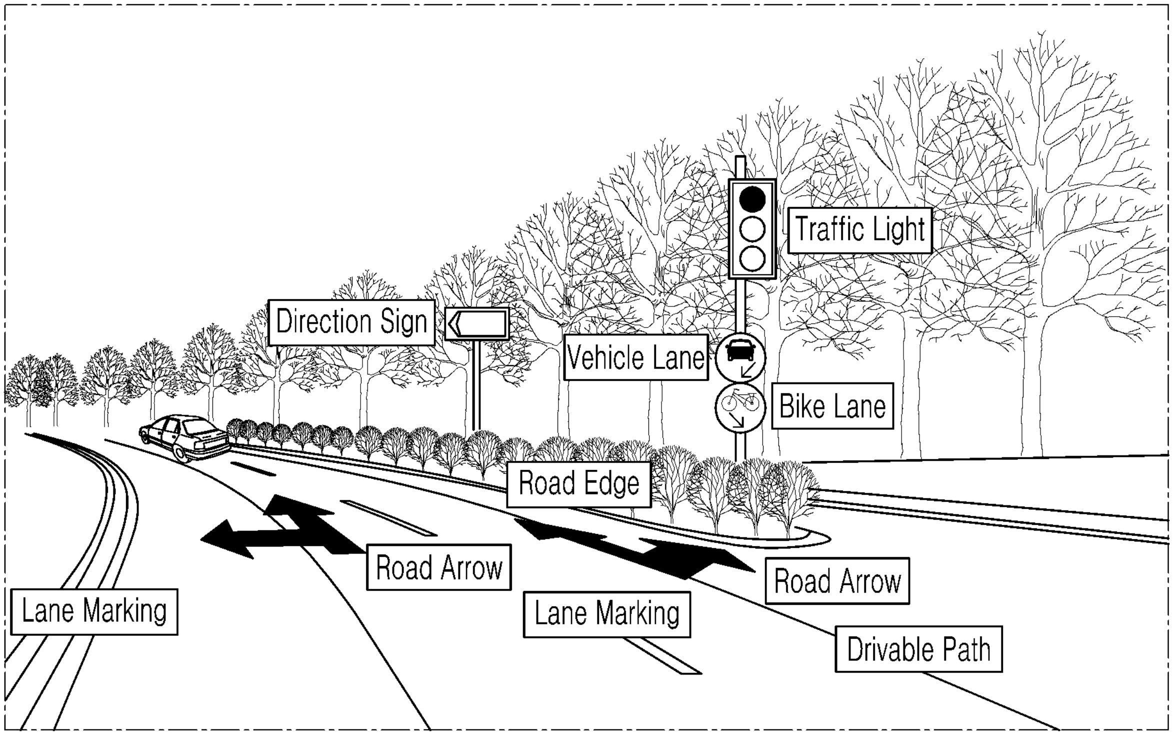
FIG. 6 is a diagram for describing an example of a plurality of objects included in image data, according to an embodiment.

FIG. 6 is a diagram for describing an example of a plurality of objects included in image data, according to an embodiment.

Image data collected through one or more monocular cameras may be used to train a deep neural network model for depth estimation. The collected image data may include a plurality of objects.

Information about an object includes object type information and object attribute information. Here, the object type information is index information indicating the type of object, and includes a group indicating a supercategory, and a class indicating a subcategory. In addition, the object attribute information indicates attribute information about the current state of the object, and includes action information, rotation information, traffic information, color information, and visibility information.

In an embodiment, groups and classes included in the object type information may be as shown in Table 1 below, but are not limited thereto.

TABLE 1

| Group | Class |
|---|---|
| Flat | Road, Sidewalk, Parking, Ground, Crosswalk |
| Human | Pedestrian, Rider |
| Vehicle | Car, Truck, Bus, Bike, Mobility |
| Construction | Building, Wall, Guard rail, Tunnel, Fence, Soundproof wall, Gas station, IC, Pylon |
| Object | Pole, Traffic sign, Traffic light, Color corn |
| Nature | Vegetation, Terrain, Paddy field, Field, River, Lake |
| Void | Static |
| Lane | Dotted line, Solid line, Dotted and Solid line, Double solid line |
| Sky | Sky |
| Animal | Dog, Cat, Bird, etc |

In addition, information included in the object attribute information may include Action information, Rotate information, Traffic information, Color information, and Visibility information.

Action information represents a movement of an object, and may be defined as 'Stopped', 'Parked', 'Moving', or the like. Object attribute information of a vehicle may be determined as 'Stopped', 'Parked', or 'Moving', and object attribute information of an immovable object, such as a traffic light, may be determined as 'Stopped', which is a default.

Rotate information represents the rotation of an object, and may be defined as 'Forward', 'Backward', 'Horizontal', 'Vertical', 'Lateral', or the like. Object attribute information of a vehicle may be determined as 'Front', 'Rear', or 'Side', and object attribute information of a horizontal or vertical traffic light may be determined as 'Horizontal' or 'Vertical'.

Traffic information refers to traffic-related information of an object, and may be defined as 'Instruction', 'Caution', 'Regulation', 'Auxiliary sign', or the like of a traffic sign. Color information is information about the color of an object, and may represent the color of an object, a traffic light, or a traffic sign.

Referring to FIG. 6, objects included in collected image data may include a traffic light, a sign, a current driving lane, a road marking, a crosswalk, a bump, an intersection, and the like, but are not limited thereto.

Meanwhile, as described above, the autonomous vehicle may need to predict movements or trajectories of the preceding vehicle 51 and the traveling vehicle 53 for safe driving.

In order to predict movements or trajectories of nearby vehicles traveling around the autonomous vehicle, past driving information accumulated regarding driving of the nearby vehicles, and map information may be used.

Hereinafter, a method of probabilistically calculating distributions of target locations for a current target vehicle by using movement information of one or more past nearby vehicles, and predicting a trajectory for the current target vehicle by using the distributions of the target locations will be described with reference to FIG. 7 and the following drawings.

Figure 7:
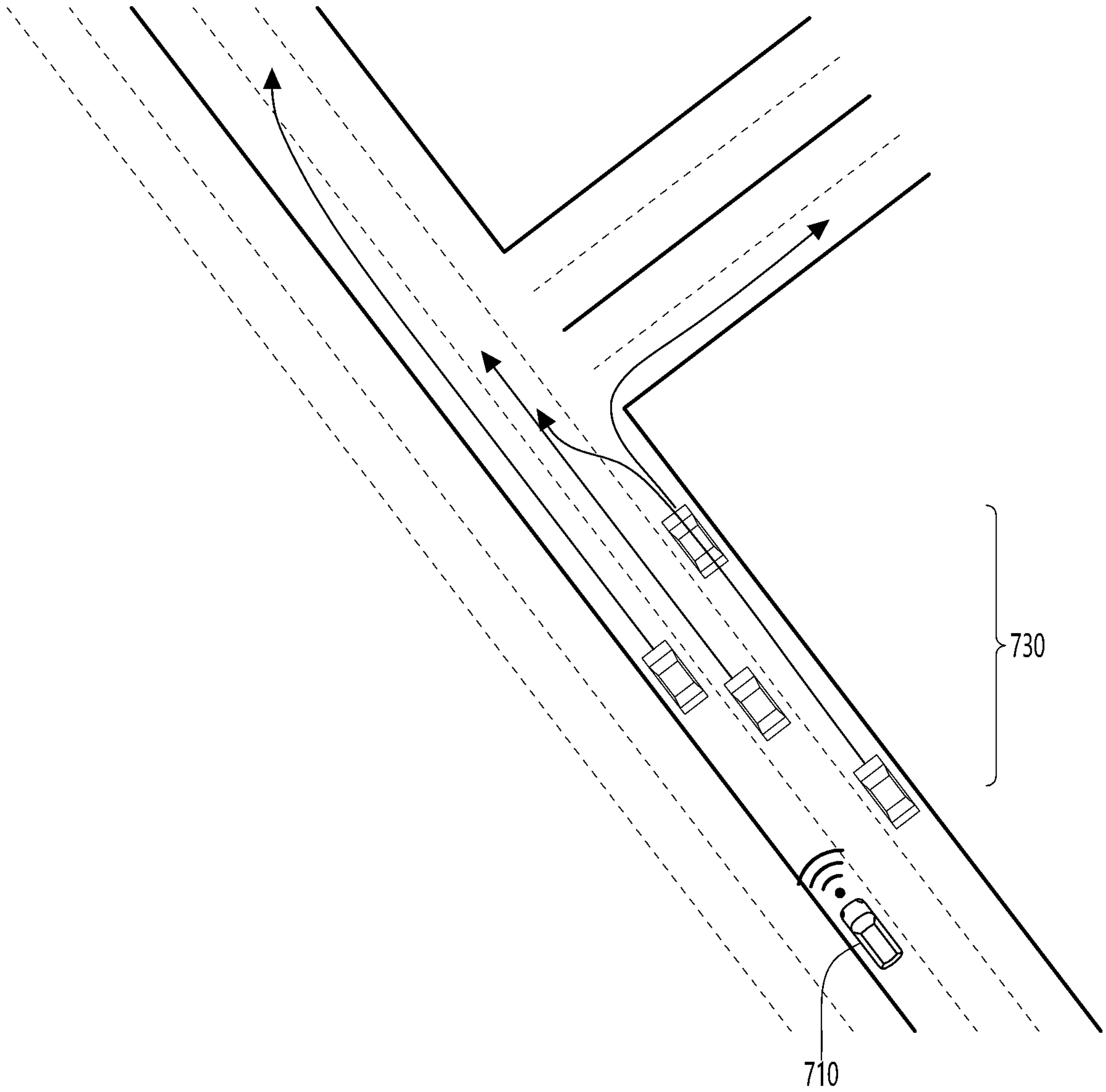
FIG. 7 is a diagram for describing a method of receiving pieces of movement information about one or more past nearby vehicles, according to an embodiment.

FIG. 7 is a diagram for describing a method of receiving pieces of movement information about one or more past nearby vehicles, according to an embodiment.

Referring to FIG. 7, the server 20 may receive pieces of movement information about one or more past nearby vehicles at a reference location of a past driving vehicle.

A past driving vehicle 710 may refer to an autonomous vehicle that was driving on a road at a previous time point. As described above, the past driving vehicle 710 may be equipped with an in-vehicle device 20 (e.g., an autonomous driving device), and thus may obtain image data by using a sensor.

As described above, the image data may include driving data regarding vehicles driving nearby. That is, the image data may include movement information about nearby vehicles with respect to the location of the autonomous vehicle. For example, the image data may include data regarding a location to which a nearby vehicle that was driving in front of the autonomous vehicle at a certain time point have moved at another time point.

According to an embodiment, the in-vehicle device in the autonomous vehicle may obtain image data while repeatedly driving a particular section. That is, the device in the past driving vehicle 710 described above may accumulate and store image data obtained while repeatedly driving a particular section. For example, the accumulated image data may include movement information about one or more past nearby vehicles.

According to an embodiment, a server may receive, from the device in the past driving vehicle, movement information about one or more past nearby vehicles at a reference location of the past driving vehicle.

FIG. 7 illustrates pieces of movement information 430 about past nearby vehicles with respect to a location of the past driving vehicle 710. The pieces of movement information 430 may include information about locations to which four past nearby vehicles that were driving in front of the past driving vehicle 710 have moved at a certain time point.

Meanwhile, as described above, the movement information may include log data regarding movements of the past nearby vehicles. That is, the log data may refer to pieces of movement information about the nearby vehicles repeatedly obtained in a particular section.

According to an embodiment, the server may record the log data in a space where the above-described particular section is divided into a grid. For example, a location value or a speed value of a past nearby vehicle at a certain time point may be recorded in a cell of the grid space, and a location value or a speed value of the past nearby vehicle at another time point may be recorded in another cell of the grid space.

According to another embodiment, the server may obtain a categorical distribution by using the log data. For example, by using the categorical distribution, it is possible to statistically identify locations to which vehicles at a particular speed and at a particular location move more and less.

Figure 8:
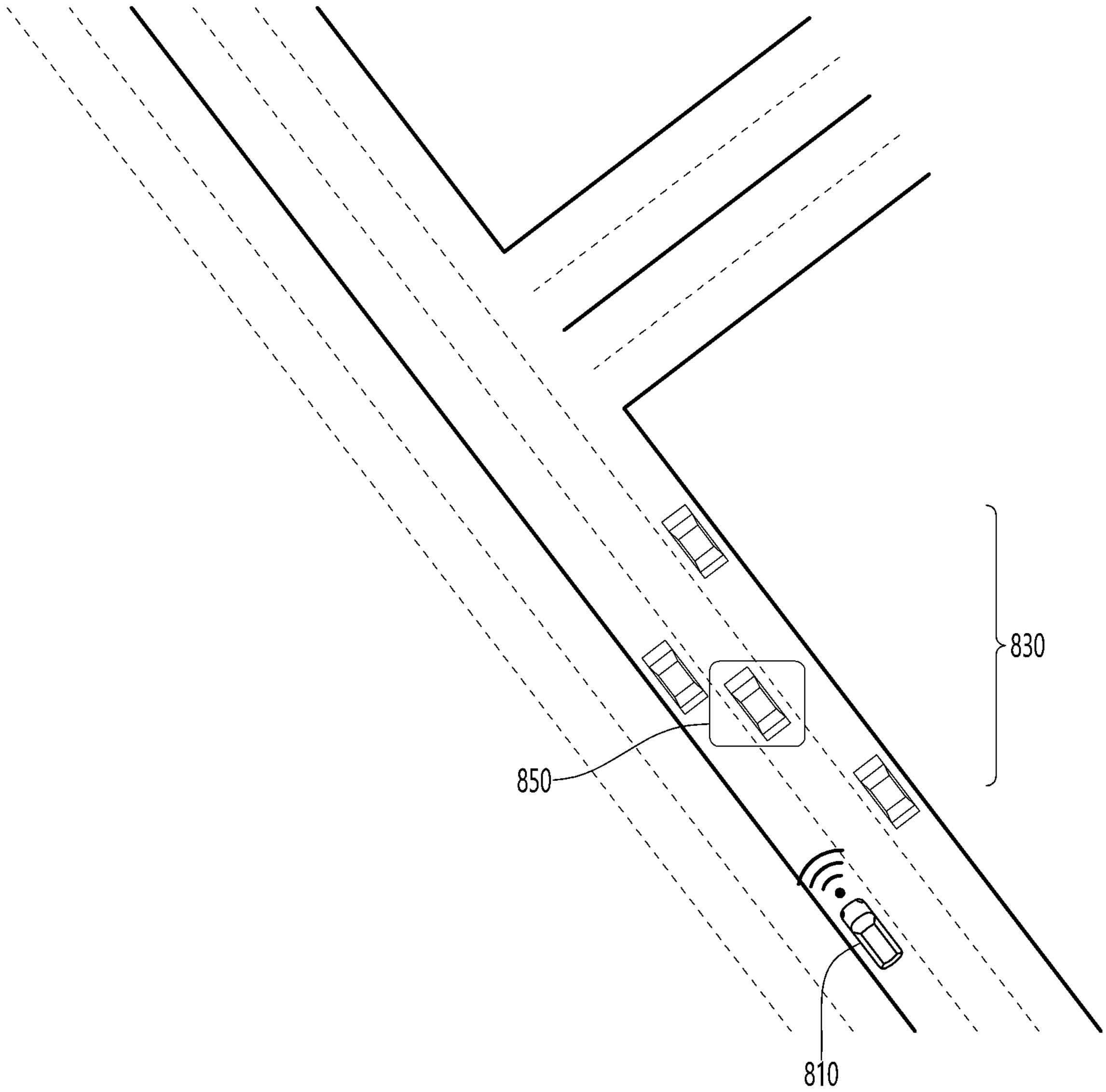
FIG. 8 is a diagram for describing a method of obtaining first state information about past nearby vehicles from pieces of movement information, according to an embodiment.

FIG. 8 is a diagram for describing a method of obtaining first state information about past nearby vehicles from pieces of movement information, according to an embodiment.

Referring to FIG. 8, the server may obtain first state information about one or more past nearby vehicles at a first time point, from pieces of movement information. Here, the first time point may correspond to a previous time point before a reference time point. For example, the first time point may refer to a particular time point in the past or a continuous time interval in the past.

As described above, the movement information may include information related to driving of past nearby vehicles that have driven around the past driving vehicle. The information related to the driving may include the locations, speeds, lanes, relative distances, steering directions, and the like of the nearby vehicles. Accordingly, the first state information may include location values and speed values of the past nearby vehicles.

According to an embodiment, the location value of the past nearby vehicle may be determined based on a location of the past driving vehicle. For example, the location value of the past nearby vehicle may be determined based on coordinates having an origin at the location of the past driving vehicle. As another example, the location value of the past nearby vehicle may be determined as a relative location with respect to the location of past driving vehicles.

Meanwhile, the speed value of the past nearby vehicle may refer to a speed value at the moment when the past nearby vehicle had the above-described location value.

FIG. 8 illustrates that first state information about past nearby vehicles 830 at a reference location of a past driving vehicle 810 is obtained. At this time, the server obtains state information about past nearby vehicles from accumulated pieces of movement information of the past nearby vehicles, and a plurality of past nearby vehicles having the same state information may be present in the pieces of movement information. For example, FIG. 8 illustrates one past nearby vehicle 850, but a plurality of vehicles may have the same location value and speed value. That is, as described above, a plurality of past nearby vehicles may have the same location value and speed value at the first time point, which is a time point in the past, but may have different location values and speed values at another time point after the first time point.

Hereinafter, movement locations of a plurality of past nearby vehicles 850 having the same location value in FIG. 8 will be described with reference to FIGS. 9 and 10.

Figure 9:
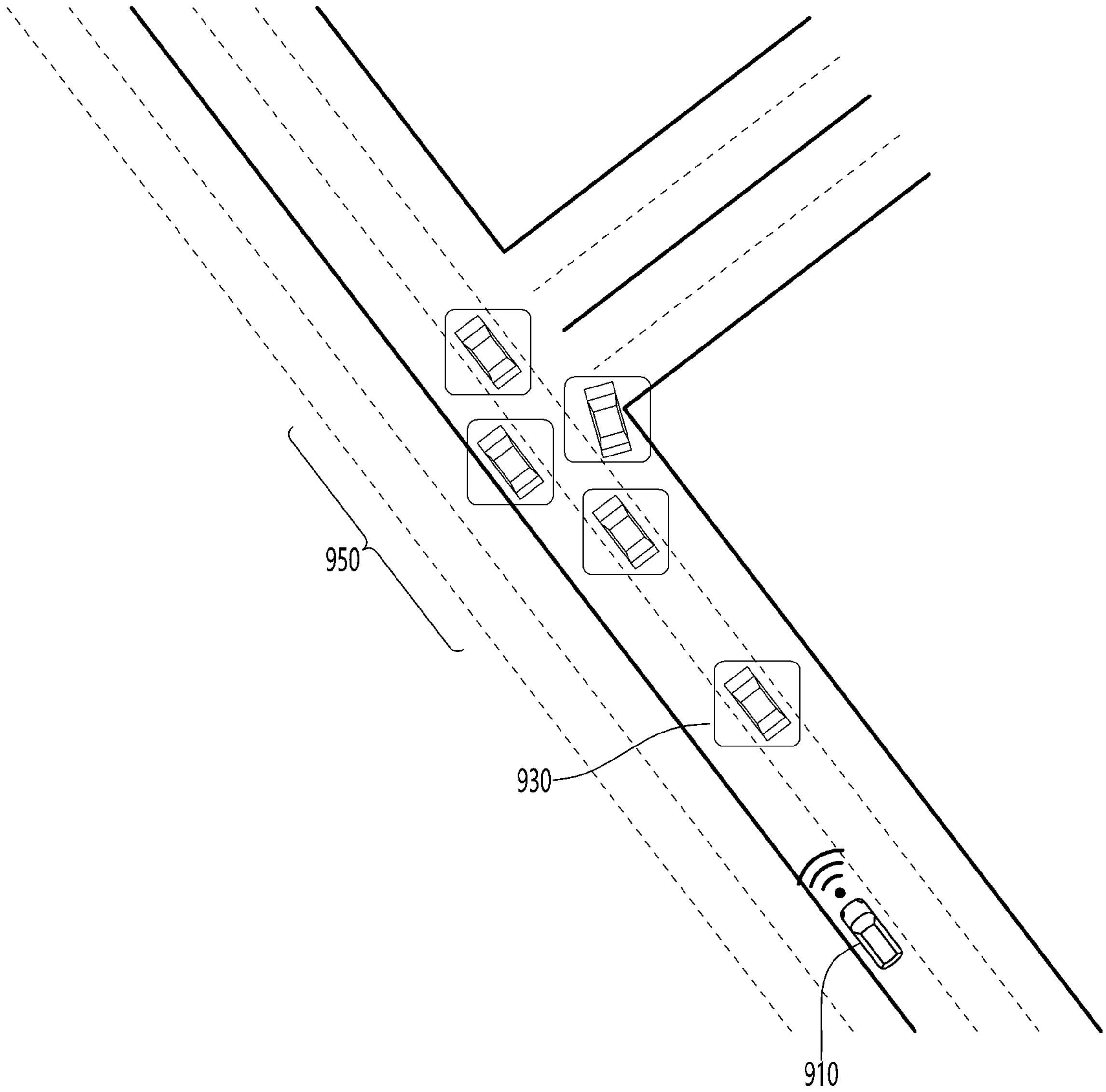
FIGS. 9 and 10 are diagrams for describing a method of obtaining movement locations of past nearby vehicles, from pieces of movement information, according to an embodiment.
Figure 10:
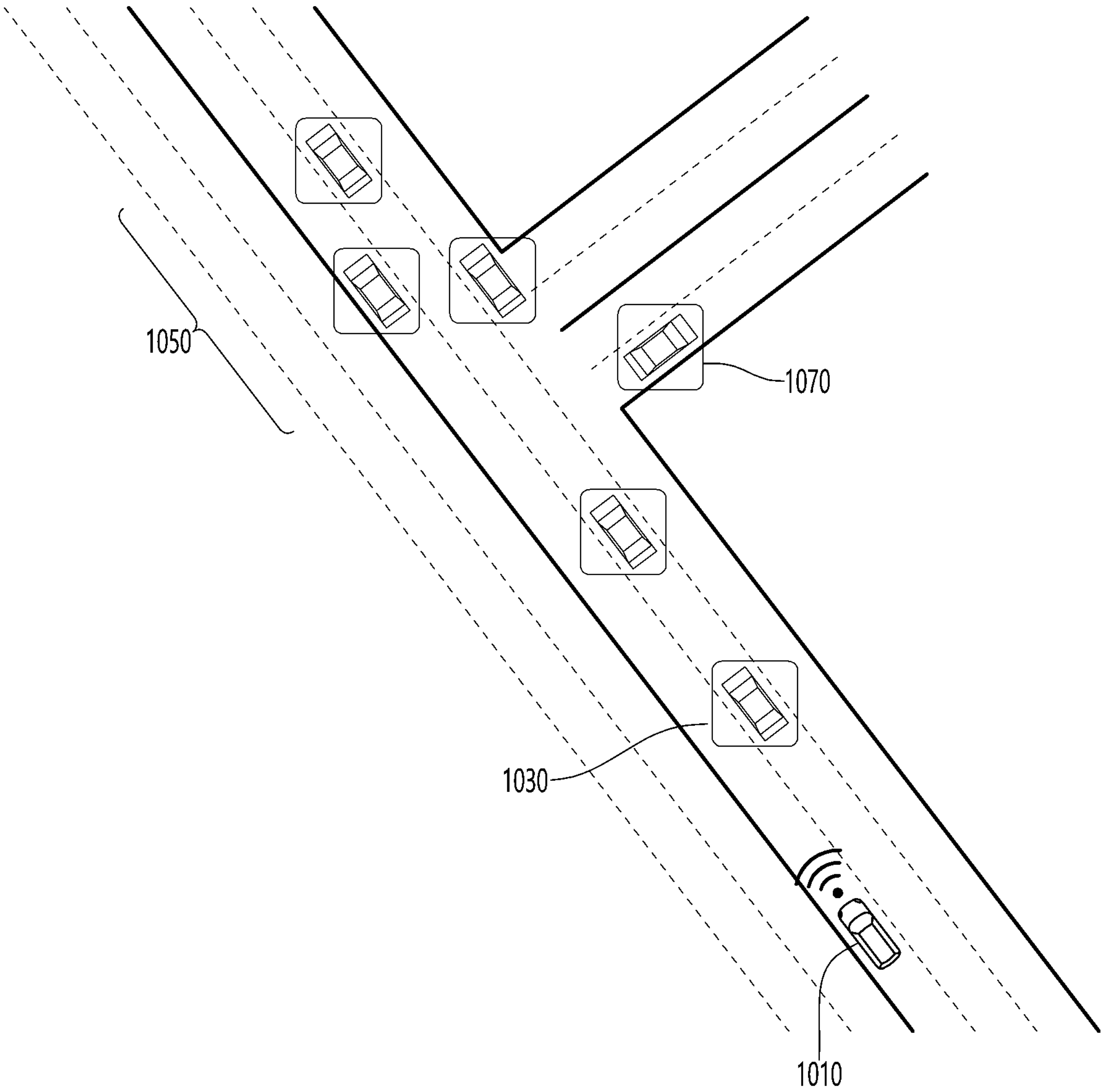

FIGS. 9 and 10 are diagrams for describing a method of obtaining movement locations of past nearby vehicles, from pieces of movement information, according to an embodiment.

Referring to FIGS. 9 and 10, the server may obtain, from pieces of movement information, movement locations of one or more past nearby vehicles at a second time point at which a preset time period has elapsed from the first time point. Here, the second time point, like the first time point, may correspond to a time point in the past before the reference time point.

Meanwhile, as described above, the movement information may include information related to driving of past nearby vehicles that have driven around the past driving vehicle, and thus, the server may obtain information about locations to which the past nearby vehicles have moved, from the pieces of movement information.

Here, the movement locations may be understood as movement locations of all past nearby vehicles included in the movement information, rather than a movement location of a particular past nearby vehicle.

However, for connectivity with the descriptions provided above with reference to FIG. 8 and for the convenience of description, obtaining movement locations of a plurality of past nearby vehicles 930 and 1030 having a particular location value at the first time point will be described with reference to FIGS. 9 and 10.

For example, referring to FIG. 9, vehicles 930 driving in front of a past driving vehicle 910 and in a lane on the right of a reference location of the past driving vehicle 910 may be one or more past nearby vehicles 930 having first state information at the first time point. For example, it is assumed that the vehicles 930 having the first state information at the first time point are four past nearby vehicles.

Thereafter, at the second time point at which a preset time period has elapsed from the first time point, the four past nearby vehicles may have moved to different locations. For example, FIG. 9 illustrates that movement locations 950 of the respective past nearby vehicles at the second time point are obtained.

As another example, referring to FIG. 10, as in FIG. 9, vehicles 1030 driving in front of a past driving vehicle 1010 and in a lane on the right of a reference location of the past driving vehicle 1010 may be one or more past nearby vehicles 1030 having first state information at the first time point. As in FIG. 9, it is assumed that the vehicles 1030 having the first state information at the first time point are four past nearby vehicles.

Thereafter, at the second time point at which a preset time period has elapsed from the first time point, the four past nearby vehicles may have moved to different locations. For example, FIG. 10 illustrates that movement locations 1050 and 1070 of the respective past nearby vehicles at the second time point are obtained.

It may be seen that the movement locations 950 of the four past nearby vehicles in FIG. 9 are relatively close to each other. On the other hand, in FIG. 10, it may be seen that the movement locations 1050 of three vehicles and the movement location 1070 of one vehicle are on different roads.

Meanwhile, referring to FIGS. 9 and 10, it may be seen that movement locations of one or more past nearby vehicles at the second time point may be obtained differently according to the preset time period. For example, it may be estimated that the preset time period in FIG. 9 is less than the preset time period in FIG. 10.

Here, the preset time period may be associated with a time point for which distributions of target locations for a current target vehicle are probabilistically calculated. For example, when it is desired to calculate distributions of target locations at a time point at which a time period $t_x$ has elapsed from the reference time point, the time interval between the first time point and the second time point may also be the time period $t_x$. This will be described in detail below with reference to FIGS. 13 and 14.

Meanwhile, according to an embodiment, movement locations of one or more past nearby vehicles may be specified as information about roads and lanes on which the vehicles are driving. For example, a movement location of a past nearby vehicle may be a location specified by at least one of the road on which the past nearby vehicle was driving at the second time point and a lane included in the road.

Figure 11:
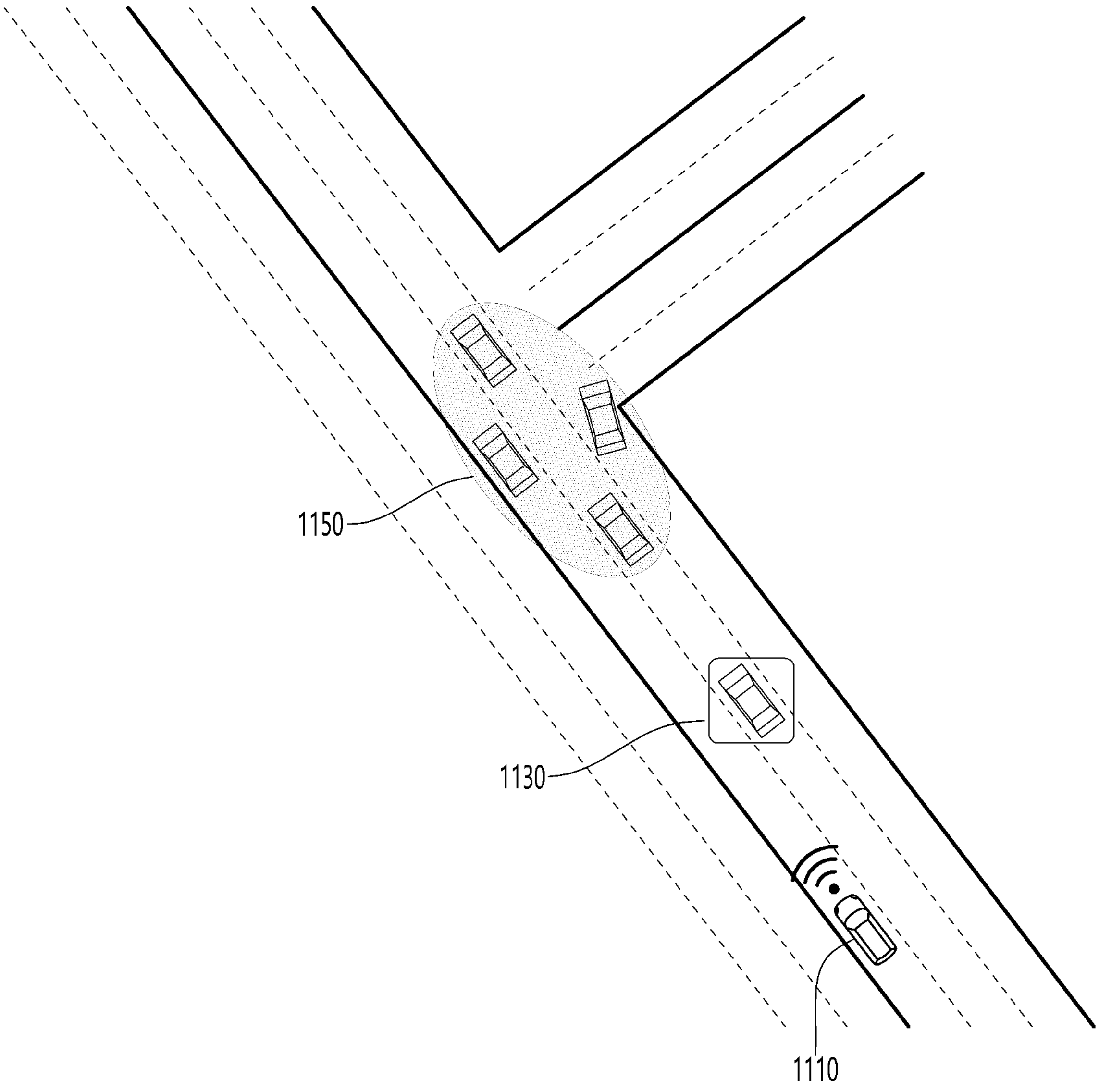
FIGS. 11 and 12 are diagrams for describing a method of probabilistically calculating distributions of movement locations by using a clustering technique, according to an embodiment.
Figure 12:
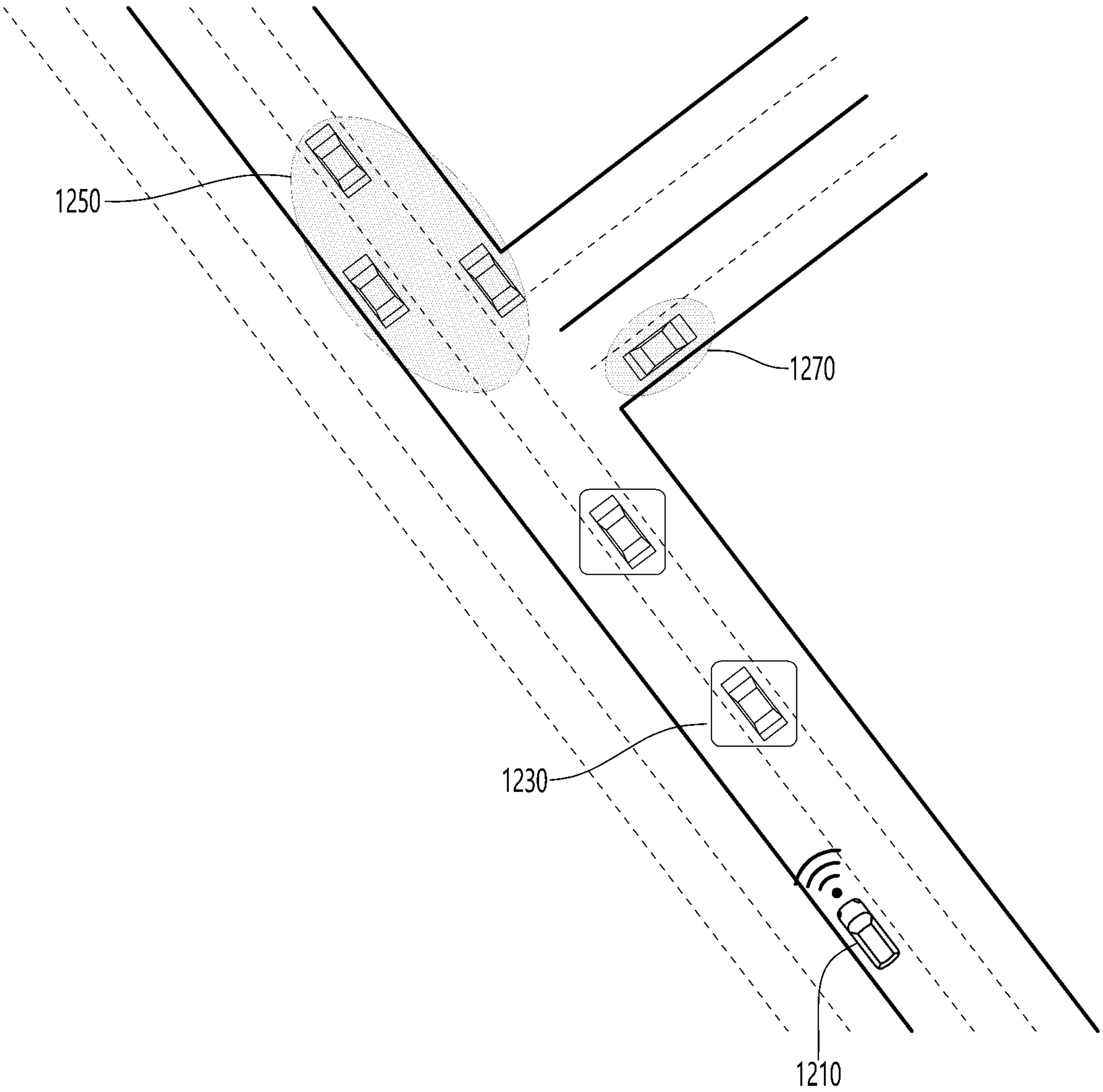

FIGS. 11 and 12 are diagrams for describing a method of probabilistically calculating distributions of movement locations by using a clustering technique, according to an embodiment.

Referring to FIGS. 11 and 12, the server may probabilistically calculate distributions of movement locations by using a clustering technique.

As described above, movement locations of one or more past nearby vehicles may be relatively clustered as illustrated in FIG. 9. Alternatively, the locations may be scattered as illustrated in FIG. 10.

According to an embodiment of the present disclosure, in order to predict a future trajectory for a current target vehicle by using movement locations of one or more past nearby vehicles, distributions of movement locations may be probabilistically calculated by using a clustering technique. That is, by calculating distributions of movement locations by using a clustering technique, data that may be easily used to predict a future trajectory may be generated.

The clustering technique may refer to a data mining technique for classifying objects to be clustered, into clusters of objects having similar characteristics, based on similarity or distance. For example, the clustering technique may include at least one of K-means clustering, mean-shift clustering, density-based spatial clustering of applications with noise (DBSCAN), and Gaussian Mixture Model (GMM).

According to an embodiment, the server may generate one or more clusters of movement locations by using a clustering technique. For example, when more than a threshold number of movement locations of one or more nearby vehicles are within a radius having a certain value, the server may generate one cluster by using DBSCAN.

According to the embodiment, the server may approximate each generated cluster as a Gaussian distribution. Thereafter, the server may obtain a Gaussian mixture distribution of movement locations by applying GMM to one or more clusters approximated as Gaussian distributions. According to an embodiment, a distribution of movement locations may be approximated as a Gaussian distribution, making it easy to calculate the distribution of movement locations.

FIGS. 11 and 12 illustrate that distributions of movement locations of one or more past nearby vehicles 1130 and 1230 that are assumed to have the same location value as described above are probabilistically calculated.

The example of FIG. 11 illustrates a location value 1130 at the first time point and a distribution 1150 of movement locations at the second time point, for one or more past nearby vehicles in front of a past driving vehicle 1110. That is, four past nearby vehicles having the same location value at the first time point have moved to different locations at the second time point, and the movement locations are relatively close to each other and thus may constitute one cluster 1150.

The example of FIG. 12 illustrates a location value 1230 at the first time point and distributions 1250 and 1270 of movement locations at the second time point, for one or more past nearby vehicles in front of a past driving vehicle 1210. That is, in the example of FIG. 12, four past nearby vehicles having the same location value at the first time point have moved to different locations at the second time point, and the distributions of movement locations may constitute two clusters 1250 and 1270.

In the examples of FIGS. 11 and 12, for convenience of description, it is assumed that the past driving vehicles 1110 and 1210 have the same reference location, and location values included in state information of one or more past nearby vehicles at the first time point are equal to each other. That is, through the examples of FIGS. 11 and 12, it may be seen that, when the preset time interval between the first time point and the second time point changes, distributions of movement locations may be calculated differently.

In addition, with reference to FIGS. 9 to 12, it is described above that the movement locations of the past nearby vehicles having a particular location value as the first state information at the first time point are obtained, and the distributions of the movement locations are calculated. However, according to an embodiment of the present disclosure, it may be understood that the server may obtain first state information at the first time point for each of one or more past nearby vehicles included in movement information, and probabilistically calculate distributions of movement locations at the second time point.

Meanwhile, the distributions of movement locations calculated as described above may be used to predict a future trajectory of the current target vehicle.

For example, the server may receive information about the current target vehicle from a device in a current driving vehicle, and provide a matched distribution of movement locations such that the device in the current driving vehicle to predict a future trajectory.

In detail, the server may receive second state information about the current target vehicle at a reference location and a reference time point, from the device in the current driving vehicle. As described above, the current driving vehicle may refer to an autonomous vehicle that is currently driving on the road. In addition, the current driving vehicle is equipped with an autonomous driving device and thus may obtain image data by using a sensor, and the device in the current driving vehicle may predict a future trajectory of the current target vehicle.

Here, the current target vehicle may refer to a vehicle for which a future trajectory is to be predicted, among nearby vehicles that are driving around the autonomous vehicle at the current time point. That is, the current target vehicle may refer to a plurality of nearby vehicles.

In addition, the reference time point may refer to a time point for which the future trajectory of the current target vehicle is predicted. The reference location may refer to a location value of the current driving vehicle at the reference time point. Here, according to an embodiment of the present disclosure, in order to predict the trajectory of the target vehicle driving around the current driving vehicle by using image data obtained by a past driving vehicle, the reference locations of the past driving vehicle and the current driving vehicle may refer to the same location value.

Meanwhile, as described above, the second state information about the current target vehicle may include a location value and a speed value of the current target vehicle.

Thereafter, the server may select a distribution of movement locations that matches the second state information about the current target vehicle, from among the calculated distributions of movement locations, and provide the selected distribution to the device in the current driving vehicle.

According to an embodiment, the server may receive a location value and a speed value of the current target vehicle, and extract, from the first state information, location values of one or more past nearby vehicles within a certain range from the received location value of the current target vehicle.

Here, the certain range may vary depending on the accuracy required for calculating distributions of target locations for the current target vehicle. For example, as the difference between the location value of the current target vehicle and the locations of the past nearby vehicles decreases, more accurate distributions of target locations may be calculated. However, when the amount of movement information is limited, the certain range may be expanded to a range through which a location value similar to the location value of the current target vehicle may be extracted.

Thereafter, the server may select one or more past nearby vehicles having speed values within a certain range from the received speed value of the current target vehicle, from among one or more past nearby vehicles having the extracted location value, and select a distribution of movement locations of the selected one or more past nearby vehicles at the second time point, as the distribution of movement locations that matches the second state information about the current target vehicle.

Thereafter, the server may transmit the selected distribution of movement locations to the device in the currently traveling vehicle to allow the device in the currently traveling vehicle to predict a future trajectory.

That is, the selected distribution of movement locations may be used to estimate a distribution of target locations of the current target vehicle at a third time point. In addition, the estimated distribution of target locations of the current target vehicle may be used to predict a future trajectory of the current target vehicle.

Here, the distribution of target locations of the current target vehicle may refer to information about a point toward which the target vehicle is driving. That is, the distribution of target locations may refer to an estimate of a distribution of locations that the target vehicle reaches at a certain future time point at which a preset time period has elapsed from the reference time point.

As described above, when predicting a trajectory of a nearby vehicle driving around the autonomous vehicle, more accurate trajectory prediction may be possible by using information about a target location of the nearby vehicle. In addition, an action of the autonomous vehicle may be determined or driving of the autonomous vehicle may be controlled, by predicting a trajectory of a nearby vehicle.

Meanwhile, the third time point may correspond to a future time point at which a preset time period has elapsed from the reference time point. Here, as described above, the preset time period may refer to a time interval equal to the time interval between the first time point and the second time point. For example, when estimating a distribution of target locations of the current target vehicle after 5 seconds, information of the past nearby vehicle between the first time point and the second time point included in the movement information may be information about a time interval of 5 seconds.

Hereinafter, an example of estimating a distribution of target locations of a current target vehicle by using distributions of movement locations, and an example of predicting a future trajectory will be described with reference to FIGS. 13 and 14.

Figure 13:
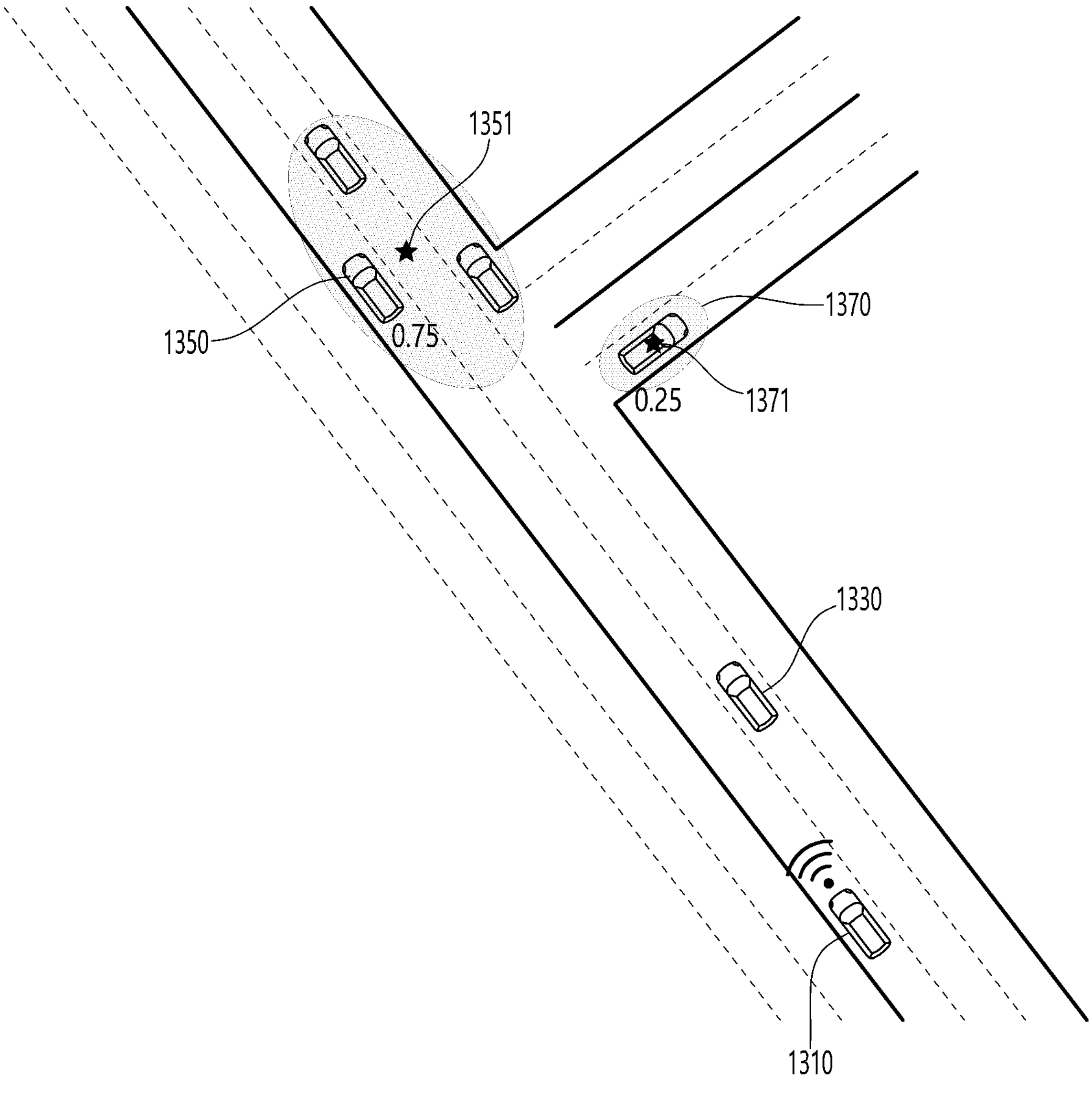
FIG. 13 is a diagram for describing a method of estimating a distribution of target locations of a current target vehicle by using distributions of movement locations, according to an embodiment.

FIG. 13 is a diagram for describing a method of estimating a distribution of target locations of a current target vehicle by using distributions of movement locations, according to an embodiment.

Referring to FIG. 13, a device 1310 in a current driving vehicle may estimate distributions 1350 and 1370 of target locations of a current target vehicle 1330 at the third time point, by using distributions of movement locations of past nearby vehicles.

In detail, the device 1310 in the current driving vehicle may obtain second state information about the current target vehicle at a reference location and a reference time point, and transmit the second state information to the server. For example, the device 1310 in the current driving vehicle may obtain a location value and a speed value of the current target vehicle 1330 through obtained image data, and transmit the obtained values to the server.

Thereafter, the device 1310 in the current driving vehicle may receive, from the server, a distribution of movement locations of the past nearby vehicles that matches the second state information about the current target vehicle. For example, when the second state information about the current target vehicle includes location value A and speed value B, the server may retrieve information about one or more past nearby vehicles having location value A and speed value B at the first time period from pieces of movement information, select movement locations and distributions of movement locations at the second time point, and provide the selected information to the device in the current driving vehicle.

Thereafter, the device 1310 in the current driving vehicle may estimate a distribution of target locations of the current target vehicle at the third time point by using the distributions of movement locations. For example, FIG. 13 illustrates that estimated target locations at the third time point for the current target vehicle 1330 at the reference time point are two clusters 1350 and 1370. It may be seen that the probabilities of the current target vehicle 1330 reaching a first target location 1350 and a second target location 1370 at the third time point are estimated to be 0.75 and 0.25, respectively.

According to an embodiment, the device 1310 in the current driving vehicle may obtain a Gaussian mixture distribution of target locations. That is, like the distribution of movement locations described above, one Gaussian distribution may be obtained with respect to the distributions of target locations of the current target vehicle.

In addition, according to an embodiment, the device 1310 in the current driving vehicle may calculate an average point of the Gaussian mixture distribution, and a probability of each cluster included in the Gaussian mixture distribution. For example, FIG. 13 illustrates that the device 1310 in the current driving vehicle obtains the distribution 1350 for the first target location and the distribution 1370 for the second target location, as well as average points 1351 and 1371 of the respectively distributions.

Figure 14:
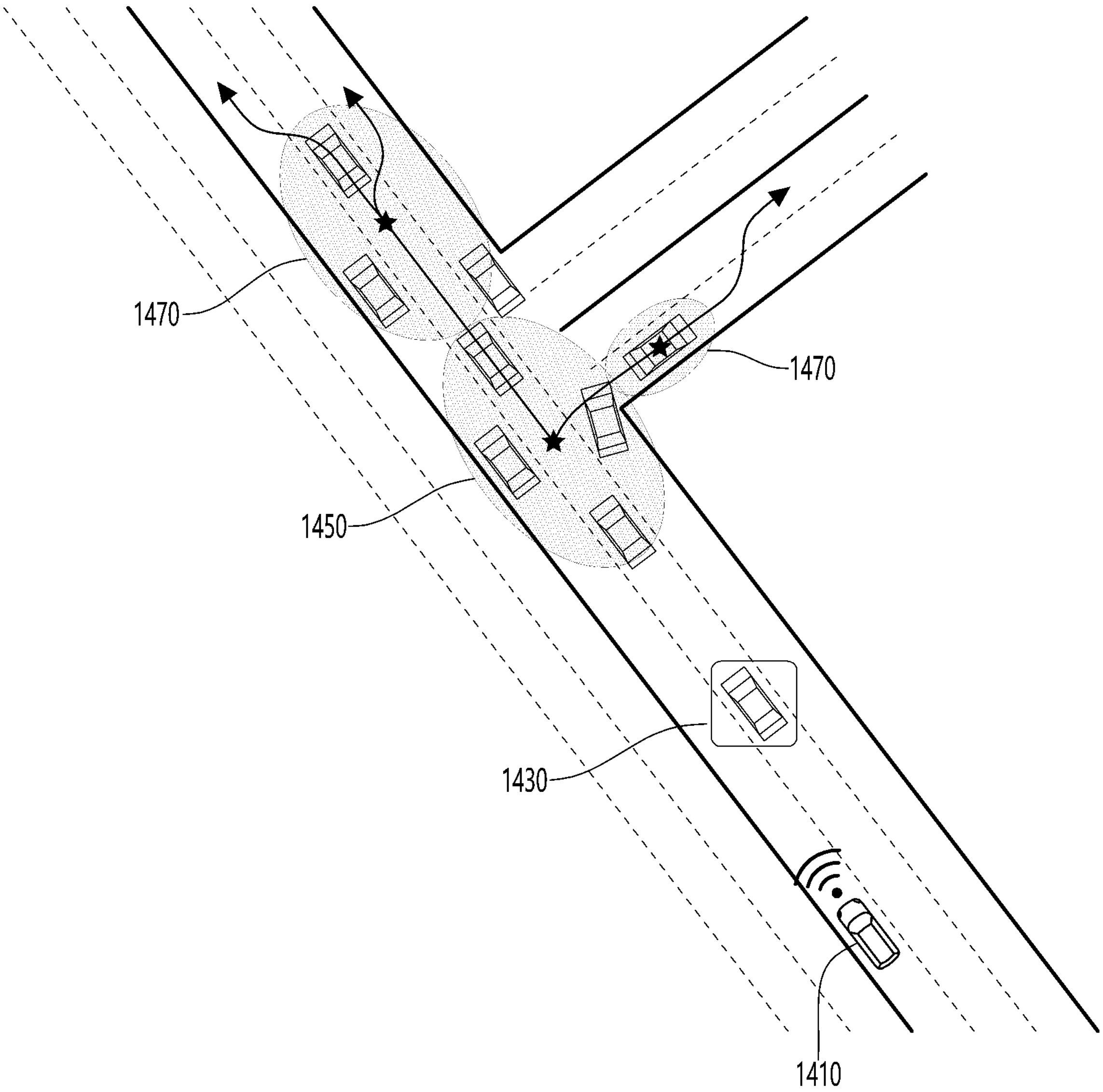
FIG. 14 is a diagram for describing a method of predicting a future trajectory of a current target vehicle by using distributions of target locations, according to an embodiment.

FIG. 14 is a diagram for describing a method of predicting a future trajectory of a current target vehicle by using distributions of target locations, according to an embodiment.

Referring to FIG. 14, a device 1410 in a current driving vehicle may predict a future trajectory of a current target vehicle 1430 by using estimated distributions of target locations as described above.

For example, the device 1410 in the current driving vehicle may estimate a distribution 1450 of target locations of the current target vehicle 1430 at the third time point. The target locations of the distribution 1450 at the third time point are relatively close to each other, and may constitute one cluster.

According to the above-described embodiment, the device 1410 in the current driving vehicle may estimate a distribution 1470 of target locations of the current target vehicle at a fourth time point by using the distributions of movement locations.

Here, the fourth time point may correspond to a future time point at which a preset time period has elapsed from the reference time point, and may correspond to a future time point after the third time point. The distribution 1470 of target locations at the fourth time point may include two clusters having different average points.

Thereafter, the device 1410 in the current driving vehicle may repeatedly estimate distributions of target locations at a fifth time point and a sixth time point, which are after the fourth time point. That is, the device 1410 in the current driving vehicle may predict a future trajectory of the current target vehicle by using distributions of target locations that are repeatedly estimated for the current target vehicle. For example, by connecting the average points of the respective clusters as illustrated in FIG. 14, a future trajectory of the current target vehicle may be predicted.

Figure 15:
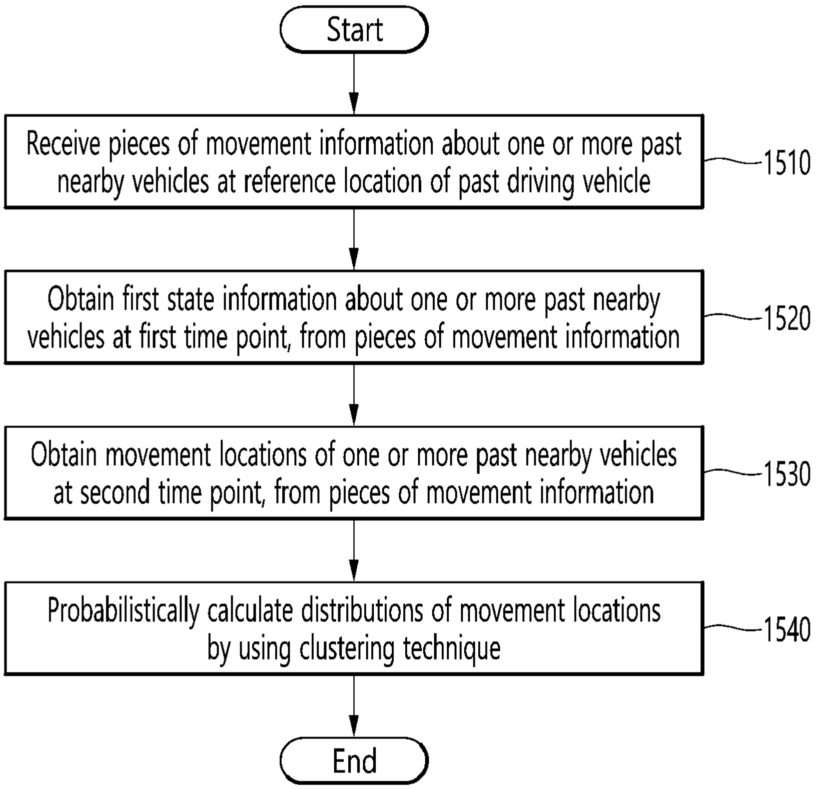
FIG. 15 is a flowchart of a method of probabilistically calculating distributions of movement locations by using pieces of movement information of past nearby vehicles, according to an embodiment of the present disclosure.

FIG. 15 is a flowchart of a method of probabilistically calculating distributions of movement locations by using pieces of movement information of past nearby vehicles, according to an embodiment of the present disclosure.

Referring to FIG. 15, a method of probabilistically calculating distributions of movement locations of past nearby vehicles by using pieces of movement information of one or more past nearby vehicles may include operations 1510 to 1540. However, the present disclosure is not limited thereto, and other general-purpose operations in addition to the operations illustrated in FIG. 15 may be further included in the method of probabilistically calculating distributions of movement locations of past nearby vehicles by using pieces of movement information of one or more past nearby vehicles.

First, in operation 1510, the server may receive pieces of movement information about one or more past nearby vehicles at a reference location of a past driving vehicle.

Then, in operation 1520, the server may obtain first state information about the one or more past nearby vehicles at a first time point, from the pieces of movement information. Here, the first time point may correspond to a previous time point before a reference time point.

According to an embodiment, the first state information may include location values and speed values of the past nearby vehicles.

Thereafter, in operation 1530, the server may obtain, from the pieces of movement information, movement locations of the one or more past nearby vehicles at a second time point at which a preset time period has elapsed from the first time point.

According to an embodiment, a movement location of a past nearby vehicle may be a location specified by at least one of a road on which the past nearby vehicle was driving at the second time point and a lane included in the road.

Thereafter, in operation 1540, the server may probabilistically calculate distributions of movement locations by using a clustering technique.

According to an embodiment, the clustering technique may include at least one of K-means clustering, mean-shift clustering, DBSCAN, and GMM.

According to an embodiment, the server may generate one or more clusters of movement locations by using a clustering technique. According to the embodiment, the server may approximate each generated cluster as a Gaussian distribution. Thereafter, the server may obtain a Gaussian mixture distribution of movement locations by applying GMM to one or more clusters approximated as Gaussian distributions.

Meanwhile, the distributions of movement locations may be used to predict a future trajectory of the current target vehicle. A selected distribution of movement locations may be used to estimate a distribution of target locations of the current target vehicle at a third time point. In addition, the estimated distribution of target locations of the current target vehicle may be used to predict a future trajectory of the current target vehicle.

Figure 16:
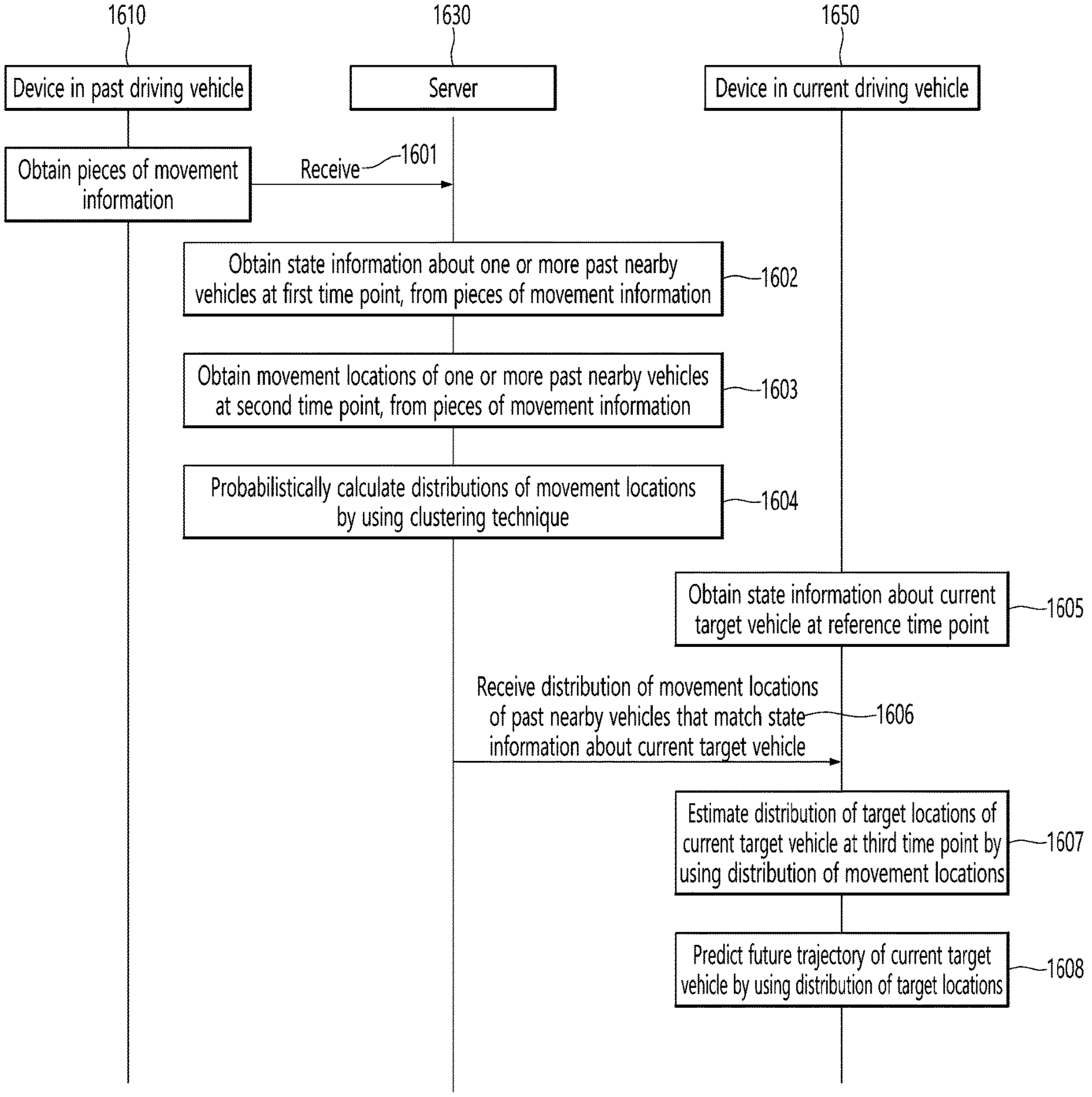
FIG. 16 is a flowchart of a method of predicting a future trajectory of a current target vehicle by using pieces of movement information of past nearby vehicles, according to an embodiment of the present disclosure.

FIG. 16 is a flowchart of a method of predicting a future trajectory of a current target vehicle by using pieces of movement information of past nearby vehicles, according to an embodiment of the present disclosure.

Referring to FIG. 16, a method of predicting a future trajectory of a current target vehicle by using pieces of movement information of one or more past nearby vehicles may include operations 1601 to 1608. However, the present disclosure is not limited thereto, and other general-purpose operations in addition to the operations illustrated in FIG. 16 may be further included in the method of predicting a future trajectory of a current target vehicle by using pieces of movement information of one or more past nearby vehicles.

First, in operation 1601, a device 1610 in a past driving vehicle may obtain movement information about one or more past nearby vehicles at a reference location of a past driving vehicle, and transmit the movement information to a server 1630.

Thereafter, in operation 1602, the server 1630 may obtain first state information about the one or more past nearby vehicles at a first time point, from the pieces of movement information. Here, the first time point may correspond to a previous time point before a reference time point.

Thereafter, in operation 1603, the server 1630 may obtain, from the pieces of movement information, movement locations of the one or more past nearby vehicles at a second time point at which a preset time period has elapsed from the first time point.

Thereafter, in operation 1604, the server 1630 may probabilistically calculate distributions of movement locations by using a clustering technique.

Thereafter, in operation 1605, a device 1650 in a current driving vehicle may obtain second state information about the current target vehicle at a reference location and a reference time point, and transmit the second state information to the server 1630.

According to an embodiment, as described above, the second state information about the current target vehicle may include a location value and a speed value of the Thereafter, in operation 1606, the device 1650 in the current driving vehicle may receive, from the server, distributions of movement locations of past nearby vehicles that match the second state information about the current target vehicle.

According to an embodiment, the server 1630 may receive the second state information about the current target vehicle at the reference location and the reference time point, from the device 1650 in the current driving vehicle. Thereafter, the server 1630 may select a distribution of movement locations that matches the second state information about the current target vehicle, from among the calculated distributions of movement locations, and provide the selected distribution to the device in the current driving vehicle.

According to an embodiment, the server 1630 may receive a location value and a speed value of the current target vehicle, and extract, from the first state information, location values of one or more past nearby vehicles within a certain range from the received location value of the current target vehicle. Thereafter, the server 1630 may select one or more past nearby vehicles having speed values within a certain range from the received speed value of the current target vehicle, from among one or more past nearby vehicles having the extracted location value, and select a distribution of movement locations of the selected one or more past nearby vehicles at the second time point, as the distribution of movement locations that matches the second state information about the current target vehicle.

Thereafter, in operation 1607, the device 1650 in the current driving vehicle may estimate a distribution of target locations of the current target vehicle at a third time point by using the distributions of movement locations. Here, the third time point may correspond to a future time point at which a preset time period has elapsed from the reference time point.

According to an embodiment, the device 1650 in the current driving vehicle may obtain a Gaussian mixture distribution of target locations. In addition, the device 1650 in the current driving vehicle may calculate an average point of the Gaussian mixture distribution, and a probability of each cluster included in the Gaussian mixture distribution.

Thereafter, in operation 1608, the device 1650 in the current driving vehicle may predict a future trajectory of the current target vehicle by using the distribution of target locations.

Hereinafter, a method and device for determining an action of the autonomous vehicle described above in FIGS. 2 to 5 based on image data obtained by the autonomous vehicle will be described with reference to FIGS. 17 to 23.

Figure 17:
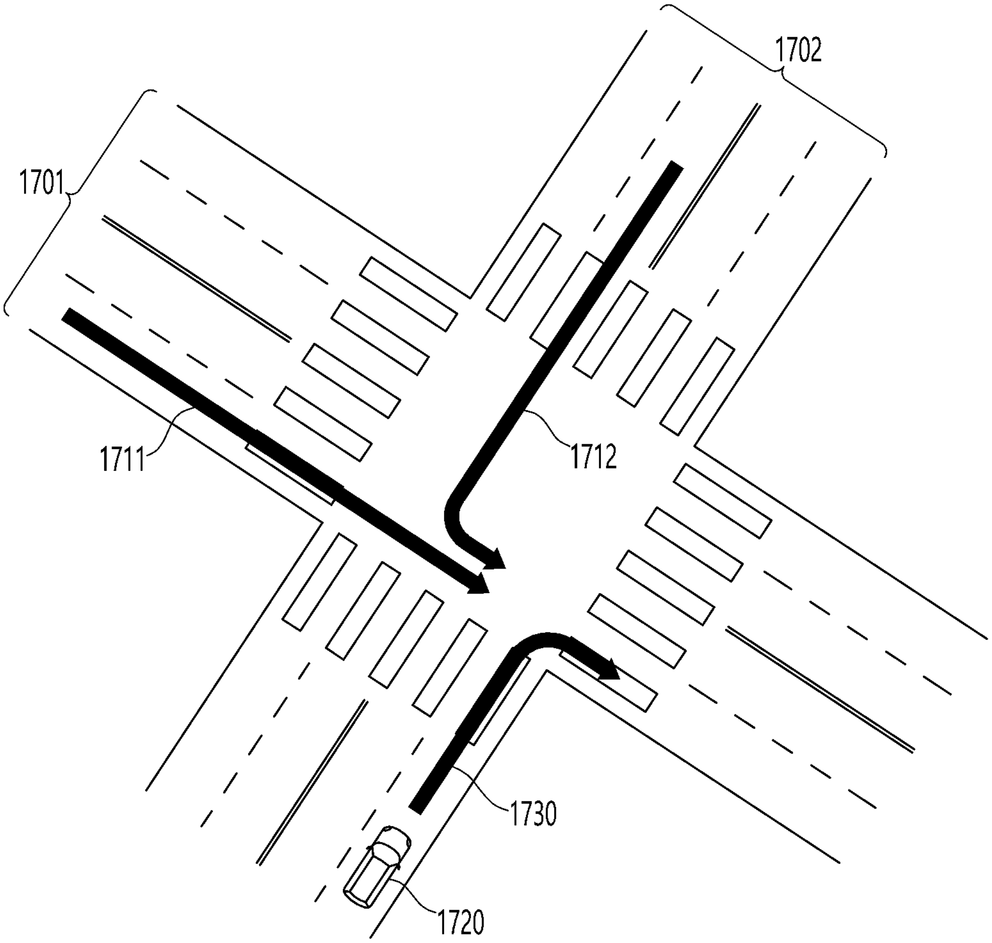
FIG. 17 is a diagram for describing a method of obtaining a collision lane, according to an embodiment of the present disclosure.

FIG. 17 is a diagram for describing a method of obtaining a collision lane, according to an embodiment of the present disclosure.

Referring to FIG. 17, an in-vehicle device may obtain a collision lane. According to an embodiment, the in-vehicle device may determine a series of actions for turning right for an autonomous vehicle planning to turn right to merge into a main road.

The collision lane may refer to a lane that may overlap with a driving path of an autonomous vehicle, among lanes included in the main road.

Referring to FIG. 17, a main road may include at least two lanes including a lane in one direction and a lane in another direction. For example, each of a main road 1701 in the 10-o'clock-to-4-o'clock direction and a main road 1702 in the 1-o'clock-to-7-o'clock direction includes four lanes.

Meanwhile, the driving path of the autonomous vehicle may refer to a path set for the autonomous vehicle to turn right. The driving path may refer to a path set by the above-described autonomous driving device. Alternatively, the driving path may be a path set by an external server and may refer to a path received by the autonomous driving device, but is not limited thereto.

For example, referring to FIG. 17, a driving path 1730 for an autonomous vehicle 1720 to turn right to merge into a main road may be set. Here, some lanes 1711 and 1712 included in the main roads 1701 and 1702 may overlap the driving path 1730 of the autonomous vehicle. The lanes 1711 and 1712 described above may be set as collision lanes.

According to an embodiment, the in-vehicle device may set a collision lane from image data obtained by a sensor of the above-described autonomous vehicle. Alternatively, according to another embodiment, the in-vehicle device may obtain a collision lane by receiving information about lanes from an external device or an external server.

Figure 18:
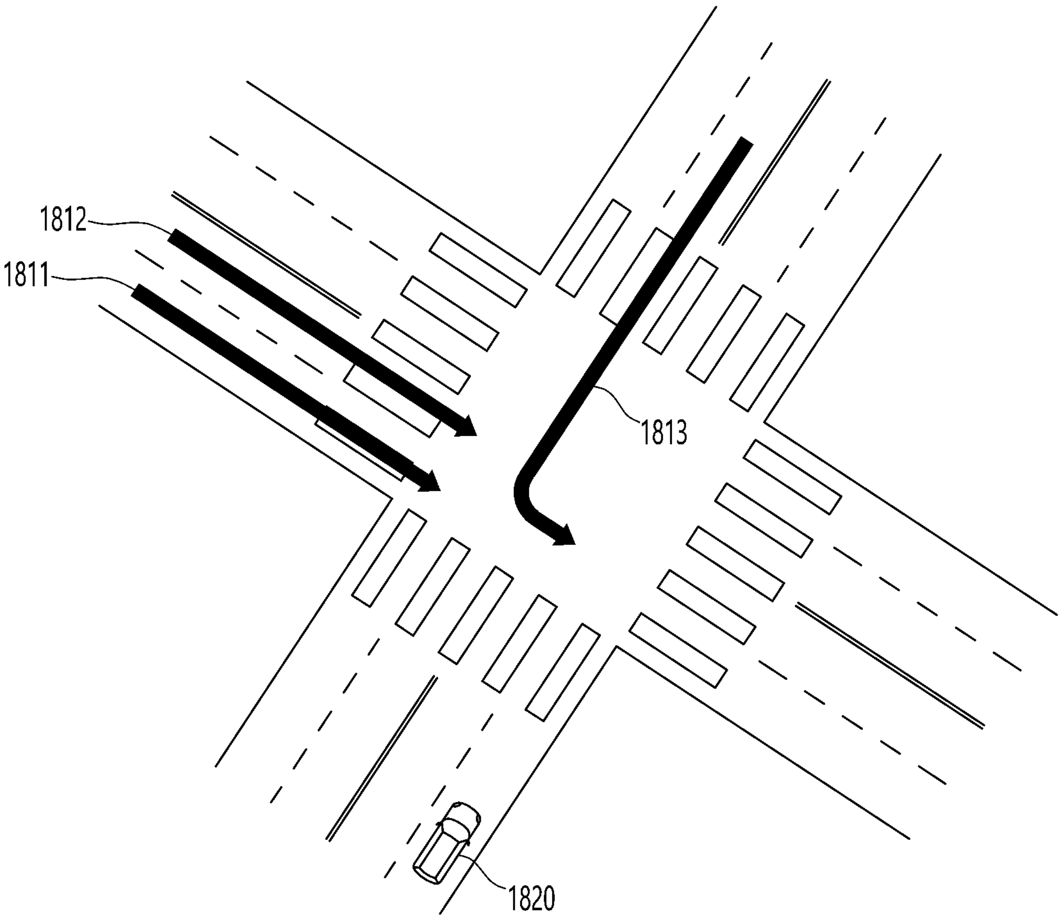
FIGS. 18 and 19 are diagrams for describing a method of identifying candidate vehicles from among vehicles driving in a collision lane, according to an embodiment of the present disclosure.
Figure 19:
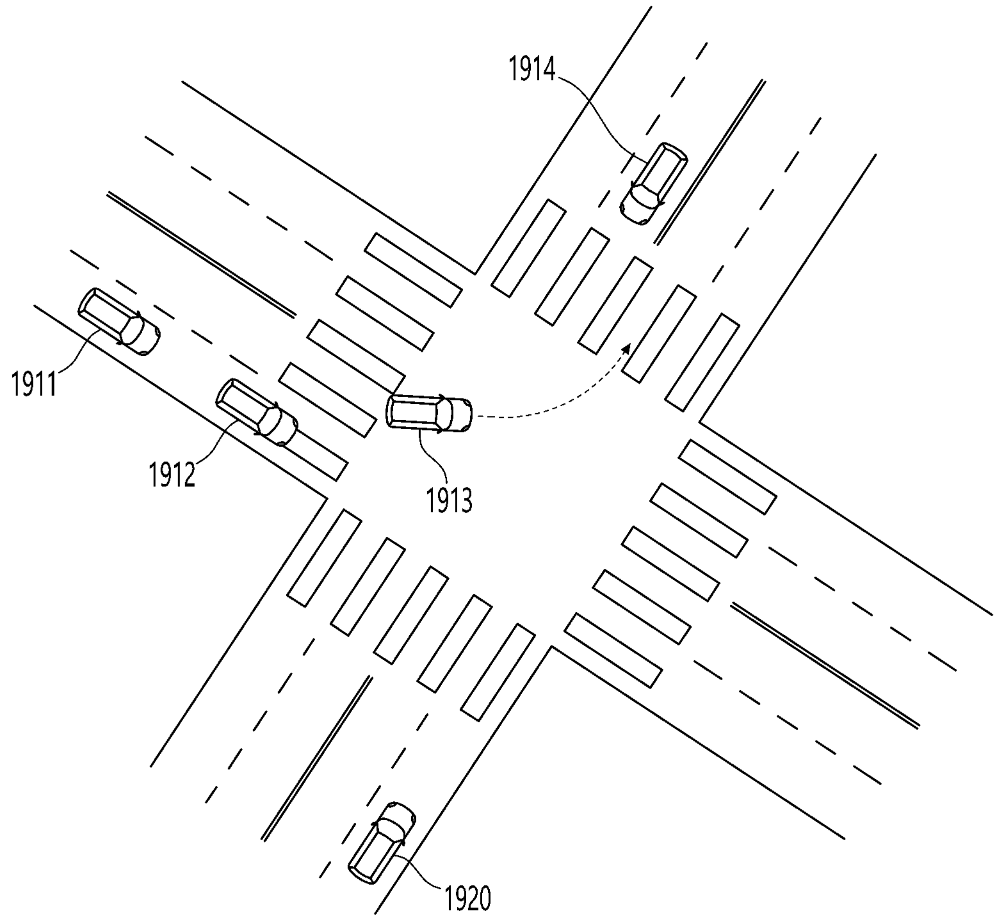

FIGS. 18 and 19 are diagrams for describing a method of identifying candidate vehicles from among vehicles driving in a collision lane, according to an embodiment of the present disclosure.

Referring to FIG. 18 as an example of the present disclosure, a device in an autonomous vehicle 1820 may obtain collision lanes 1811 to 1813 that may overlap a driving path of the autonomous vehicle 1820 among lanes included in a main road.

For example, one or more vehicles may be driving in the collision lanes 1811 to 1813. Here, in order to determine an action of the autonomous vehicle 1820, the in-vehicle device may collect information mainly about a vehicle that may be associated with turning right of the autonomous vehicle 1820, among the one or more vehicles.

Referring to FIG. 19, the in-vehicle device may identify one or more candidate vehicles that are likely to collide with an autonomous vehicle 1920, from among vehicles driving in the collision lanes.

For example, two vehicles 1911 and 1912 may be driving in the collision lane 1811 of FIG. 18 described above. At this time, the two vehicles 1911 and 1912 is likely to collide with the autonomous vehicle 1920 on the main road, and thus may be identified as candidate vehicles.

Similarly, one vehicle 1914 may be driving in the collision lane 1813 of FIG. 18 described above. The vehicle 1914 is expected to turn left at an intersection, thus likely to collide with the autonomous vehicle 1920, which is planning to turn right, on the main road, and thus may be identified as a candidate vehicle.

As another example, one vehicle 1913 may be driving in the collision lane 1812 of FIG. 18 described above. However, the vehicle 1913 is expected to turn left at the intersection, thus is not likely to collide with the autonomous vehicle 1920 on the main road, and thus may not be identified as a candidate vehicle.

As another example, a vehicle that is driving on the main road but is not driving in the collision lane is not likely to collide with the autonomous vehicle 1920 on the main road, and thus may not be identified as a candidate vehicle.

Hereinafter, a method of using information about a collision vehicle to determine an action of the autonomous vehicle 1920 will be described.

Figure 20:
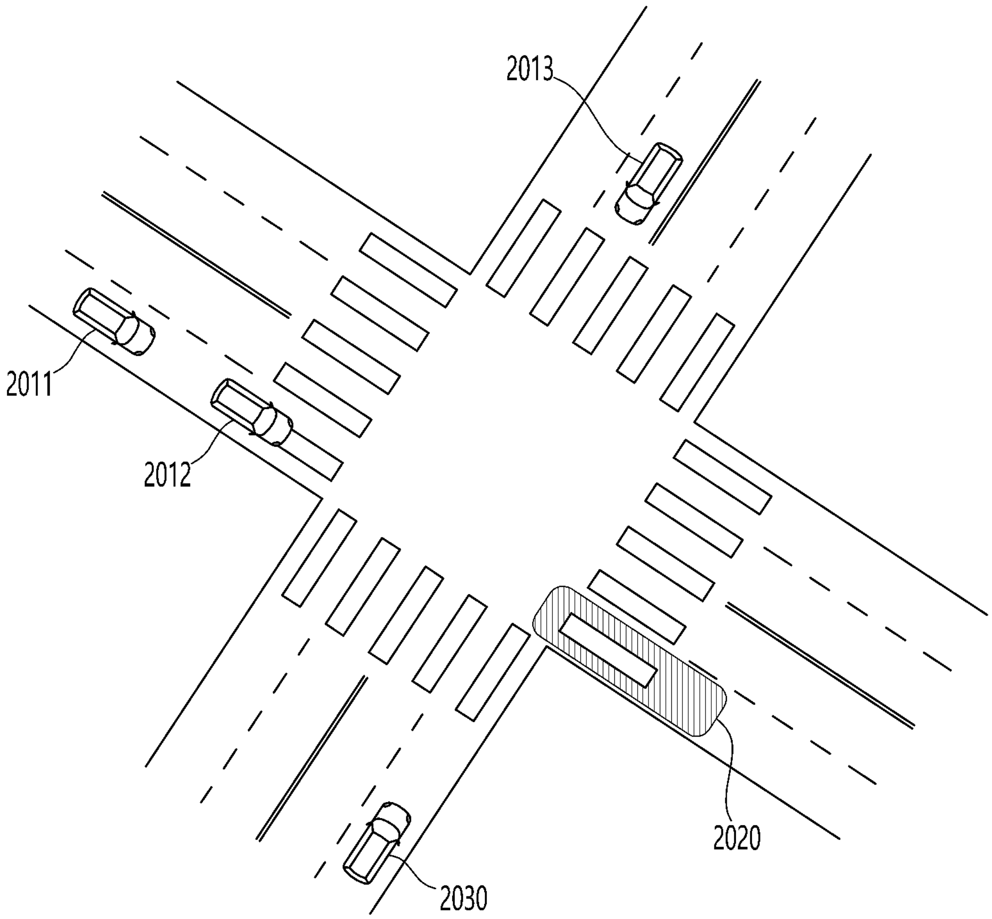
FIG. 20 is a diagram for describing a method of predicting whether a candidate vehicle will occupy a collision area, according to an embodiment of the present disclosure.

FIG. 20 is a diagram for describing a method of predicting whether a candidate vehicle will occupy a collision area, according to an embodiment of the present disclosure.

Referring to FIG. 20, an in-vehicle device may predict whether a candidate vehicle identified by the method described above will occupy a preset collision area within a preset time period by predicting a path of the candidate vehicle.

For example, the in-vehicle device may predict a future path of the candidate vehicle by using image data obtained by a sensor installed in the autonomous vehicle. For example, the in-vehicle device may receive map information and past driving information of the candidate vehicle, and predict a future path of the candidate vehicle by using the map information and the past driving information.

According to an embodiment, the in-vehicle device may estimate a distribution of target locations of the candidate vehicle and predict the future path of the candidate vehicle by using the estimated distribution of target locations. Here, the target location of the candidate vehicle may refer to a location that the candidate vehicle is to reach after a certain time period. According to an embodiment, a future trajectory of a vehicle may be more accurately predicted by using both past driving information and a distribution of target locations.

The in-vehicle device may estimate a distribution of target locations of the candidate vehicle by using accumulated past driving information about nearby vehicles driving around the autonomous vehicle. For example, the autonomous vehicle may estimate a distribution of target locations of the candidate vehicle by using a clustering technique on the accumulated past driving information. For example, the clustering technique may include DBSCAN and GMM.

Meanwhile, the in-vehicle device may predict whether the candidate vehicle will occupy a collision area within a preset time period from the current time point. For example, the preset time period may be set based on the number of seconds between the current time point and a time point for which the trajectory of the candidate vehicle is predicted. As another example, the preset time period may be set based on how many seconds it takes for the autonomous vehicle to reach the collision area. For example, the preset time period may refer to 5 seconds from the current time point.

Here, the collision area may refer to an area where the autonomous vehicle and the candidate vehicle may collide with each other after the preset time period. That is, the collision area may refer to an area corresponding to a lane in which the autonomous vehicle is likely to collide with the candidate vehicle as the autonomous vehicle turns right and merges into the main road, among lanes included in the main road.

According to an embodiment, the in-vehicle device may set the collision area based on collision lanes and the driving path of the autonomous vehicle. The in-vehicle device may set, as a collision area, an area where a collision lane and the driving path of the autonomous vehicle overlap each other.

For example, referring to FIG. 20, as described above, the in-vehicle device may predict whether the candidate vehicle will occupy a preset collision area 2020 within the preset time period, by predicting paths of vehicles 2011 to 2013 identified as candidate vehicles from among vehicles driving in the collision lanes. The in-vehicle device may determine an action of an autonomous vehicle 2030 based on a result of predicting whether the candidate vehicles 2011 to 2013 will occupy the collision area 2020.

Figure 21:
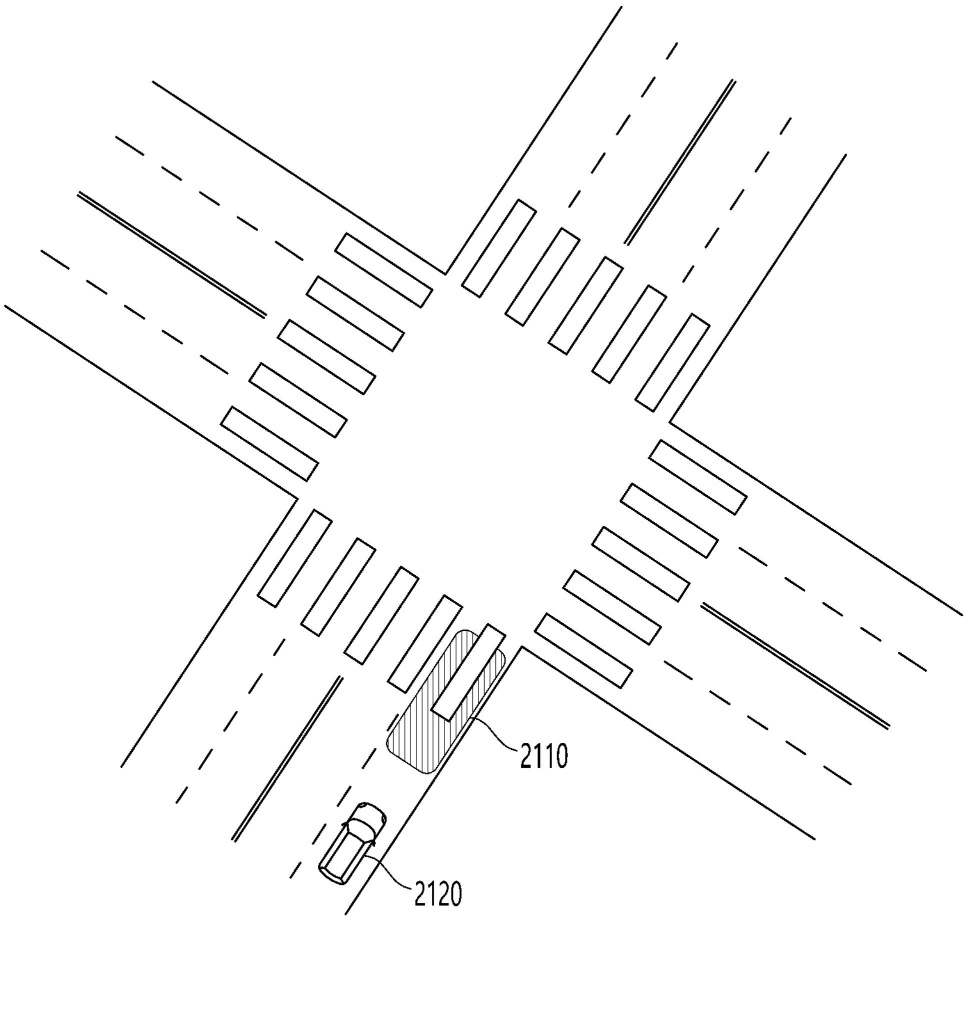
FIG. 21 is a diagram for describing a method of determining an action of an autonomous vehicle in an action determination area, according to an embodiment of the present disclosure.

FIG. 21 is a diagram for describing a method of determining an action of an autonomous vehicle in an action determination area, according to an embodiment of the present disclosure.

Referring to FIG. 21, the in-vehicle device may determine an action of an autonomous vehicle 2120 planning to turn right, based on a result of prediction of occupancy according to the method described above, and the current driving state of the autonomous vehicle 2120.

Here, the result of predicting whether a candidate vehicle will occupy a collision area may include a prediction that the candidate vehicle will occupy part of the collision area within a preset time period, and a prediction that the candidate vehicle will not occupy the collision area at all within the preset time period.

In addition, the current driving state of the autonomous vehicle 2120 may be set based on the action determination area. For example, referring to FIG. 21, an action determination area 2110 refers to an area within a preset distance from the collision area, and may refer to an area where the autonomous vehicle 2120 is to determine an action of the autonomous vehicle 2120 before entering the collision area.

The current driving state of the autonomous vehicle 2120 may include, for example, a state of entering the action determination area. As another example, the current driving state of the autonomous vehicle 2120 may include a state of slowly driving in the action determination area.

As another example, the current driving state of the autonomous vehicle 2120 may include a state of stopping in the action determination area.

Hereinafter, a detailed embodiment of determining an action of the autonomous vehicle 2120 based on a result of prediction of occupancy and the current driving state of the autonomous vehicle 2120 will be described with reference to FIG. 22.

Figure 22:
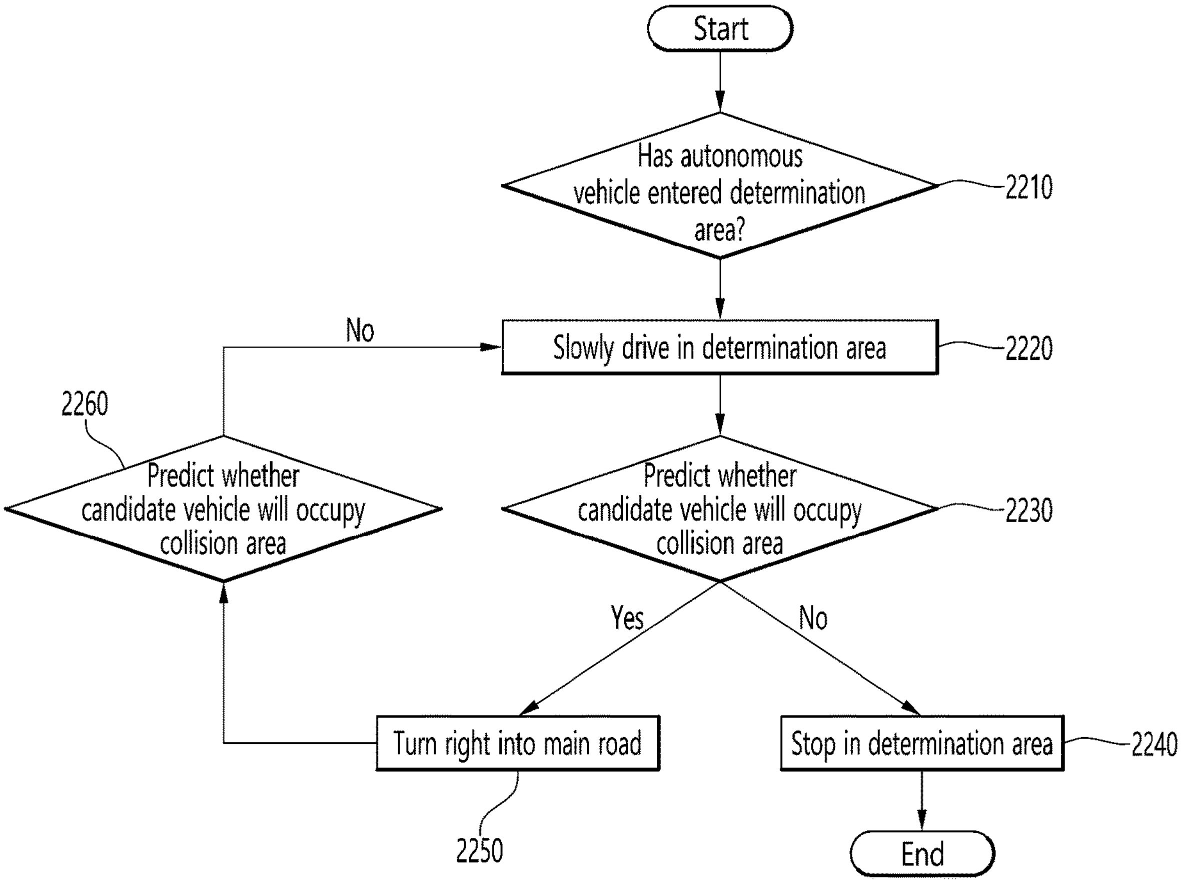
FIG. 22 is a flowchart of a method of determining an action of an autonomous vehicle in an action determination area, according to an embodiment of the present disclosure.

FIG. 22 is a flowchart of a method of determining an action of an autonomous vehicle in an action determination area, according to an embodiment of the present disclosure.

As described above with reference to FIG. 21, the in-vehicle device may determine an action of the autonomous vehicle based on a result of predicting whether a candidate vehicle will occupy a collision area, and the current driving state of the autonomous vehicle.

According to an embodiment, when the current driving state of the autonomous vehicle is a first state of entering an action determination area (2210), the in-vehicle device may determine an action of the autonomous vehicle to slowly drive in the action determination area (2220).

Meanwhile, according to an embodiment, the in-vehicle device may determine the speed at which the autonomous vehicle slowly drives. For example, the in-vehicle device may identify a pedestrian from image data obtained as described above, and determine the speed at which the autonomous vehicle slowly drives, based on the presence or absence of a pedestrian.

For example, the pedestrian may refer to a person walking on a crosswalk included in the action determination area or the collision area, or a person around the crosswalk. When no pedestrians are identified, the in-vehicle device may determine an action of the autonomous vehicle to slowly drive at a first threshold speed or less in the action determination area.

When a pedestrian is identified, the in-vehicle device may determine an action of the autonomous vehicle to slowly drive at a second threshold speed or less in the action determination area. Here, the value of the first threshold speed may be greater than the value of the second threshold speed.

According to another embodiment, when the current driving state of the autonomous vehicle is a second state of slowly driving in the action determination area (2220), the in-vehicle device may determine an action of the autonomous vehicle by predicting whether a candidate vehicle will occupy the collision area (2230).

For example, when the candidate vehicle is predicted to occupy the collision area, the in-vehicle device may determine an action of the autonomous vehicle not to pass through the collision area for a certain time period by stopping the autonomous vehicle in the action determination area (2250).

As another example, when the candidate vehicle is predicted not to occupy the collision area, the in-vehicle device may determine an action of the autonomous vehicle to pass through the collision area by turning right into the main road (2240).

According to another embodiment, when the current driving state of the autonomous vehicle is a third state of stopping in the action determination area (2250), the in-vehicle device may determine an action of the autonomous vehicle by predicting whether a candidate vehicle will occupy the collision area (2260).

For example, when the candidate vehicle is predicted not to occupy the collision area, the in-vehicle device may determine an action of the autonomous vehicle to slowly drive in the action determination area (2220).

Alternatively, when the candidate vehicle is predicted to occupy the collision area, an in-vehicle device may determine an action of the autonomous vehicle to maintain the stoppage in the action determination area (2250).

Figure 23:
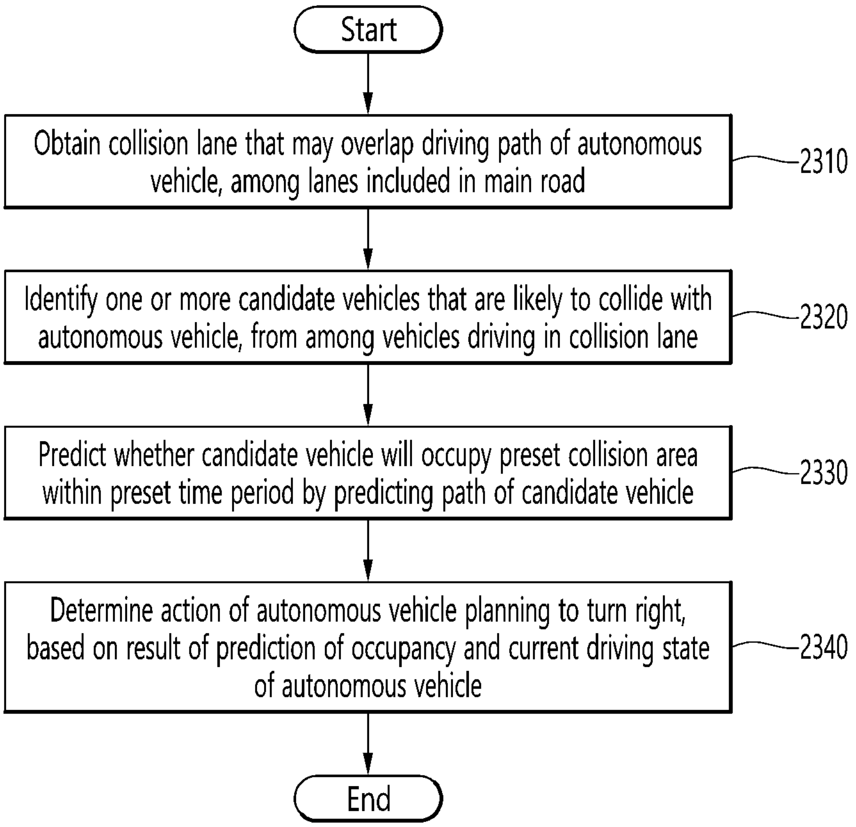
FIG. 23 is a flowchart of a method of determining an action of an autonomous vehicle, according to an embodiment of the present disclosure.

FIG. 23 is a flowchart of a method of determining an action of an autonomous vehicle, according to an embodiment of the present disclosure.

Referring to FIG. 23, a method of determining a behavior of an autonomous vehicle planning to turn right to merge into a main road may include operations 2310 to 2340. However, the present disclosure is not limited thereto, and other general-purpose operations in addition to the operations illustrated in FIG. 23 may be further included in the method of determining a behavior of an autonomous vehicle planning to turn right to merge into a main road.

First, in operation 2310, the in-vehicle device may obtain a collision lane that may overlap a driving path of the autonomous vehicle, among lanes included in the main road.

Thereafter, in operation 2320, the in-vehicle device may identify one or more candidate vehicles that are likely to collide with the autonomous vehicle, from among vehicles driving in the collision lane.

Thereafter, in operation 2330, the in-vehicle device may predict whether the candidate vehicle will occupy a preset collision area within a preset time period by predicting a path of the candidate vehicle.

According to an embodiment, the in-vehicle device may estimate a distribution of target locations of the candidate vehicle and predict a future path of the candidate vehicle by using the estimated distribution of target locations. The in-vehicle device may estimate the distribution of target locations of the candidate vehicle by using accumulated past driving information about nearby vehicles driving around the autonomous vehicle. For example, the autonomous vehicle may estimate the distribution of target locations of the candidate vehicle by using a clustering technique on the accumulated past driving information. For example, the clustering technique may include DBSCAN and GMM.

Thereafter, in operation 2340, the in-vehicle device may determine an action of the autonomous vehicle planning to turn right, based on a result of prediction of occupancy and the current driving state of the autonomous vehicle.

According to an embodiment, when the current driving state of the autonomous vehicle is a first state of entering an action determination area (2210), the in-vehicle device may determine an action of the autonomous vehicle to slowly drive in the action determination area (2220).

According to an embodiment, when the current driving state of the autonomous vehicle is a second state of slowly driving in the action determination area (2220), the in-vehicle device may determine an action of the autonomous vehicle by predicting whether the candidate vehicle will occupy the collision area (2230).

For example, when the candidate vehicle is predicted to occupy the collision area, the in-vehicle device may determine an action of the autonomous vehicle not to pass through the collision area for a certain time period by stopping the autonomous vehicle in the action determination area (2250).

As another example, when the candidate vehicle is predicted not to occupy the collision area, the in-vehicle device may determine an action of the autonomous vehicle to pass through the collision area by turning right into the main road (2240).

According to another embodiment, when the current driving state of the autonomous vehicle is a third state of stopping in the action determination area (2250), the in-vehicle device may determine an action of the autonomous vehicle by predicting whether a candidate vehicle will occupy the collision area (2260).

For example, when the candidate vehicle is predicted not to occupy the collision area, the in-vehicle device may determine an action of the autonomous vehicle to slowly drive in the action determination area (2220).

Alternatively, when the candidate vehicle is predicted to occupy the collision area, an in-vehicle device may determine an action of the autonomous vehicle to maintain the stoppage in the action determination area.

An embodiment of the present disclosure may be implemented as a computer program that may be executed through various components on a computer, and such a computer program may be recorded in a computer-readable medium. In this case, the medium may include a magnetic medium, such as a hard disk, a floppy disk, or a magnetic tape, an optical recording medium, such as a CD-ROM or a digital video disc (DVD), a magneto-optical medium, such as a floptical disk, and a hardware device specially configured to store and execute program instructions, such as ROM, RAM, or flash memory.

Meanwhile, the computer program may be specially designed and configured for the present disclosure or may be well-known to and usable by those skilled in the art of computer software. Examples of the computer program may include not only machine code, such as code made by a compiler, but also high-level language code that is executable by a computer by using an interpreter or the like.

According to an embodiment, the method according to various embodiments of the present disclosure may be included in a computer program product and provided. The computer program product may be traded as commodities between sellers and buyers. The computer program product may be distributed in the form of a machine-readable storage medium (e.g., a CD-ROM), or may be distributed online (e.g., downloaded or uploaded) through an application store (e.g., Play Store™) or directly between two user devices. In a case of online distribution, at least a portion of the computer program product may be temporarily stored in a machine-readable storage medium such as a manufacturer's server, an application store's server, or a memory of a relay server.

The operations of the methods according to the present disclosure may be performed in any suitable order unless otherwise indicated herein or otherwise clearly contradicted by context. The present disclosure is not limited to the described order of the operations. The use of any and all examples, or exemplary language (e.g., 'and the like') provided herein, is intended merely to better illuminate the present disclosure and does not pose a limitation on the scope of the present disclosure unless otherwise claimed. Also, numerous modifications and adaptations will be readily apparent to one of ordinary skill in the art without departing from the spirit and scope of the present disclosure.

Accordingly, the spirit of the present disclosure should not be limited to the above-described embodiments, and all modifications and variations which may be derived from the meanings, scopes and equivalents of the claims should be construed as failing within the scope of the present disclosure.

According to an embodiment of the present disclosure, information that may be used to predict a trajectory of a nearby vehicle may be generated by probabilistically calculating distributions of movement locations by using movement information about past nearby vehicles.

According to an embodiment of the present disclosure, a more accurate future trajectory of a nearby vehicle may be predicted by estimating a distribution of target locations of the nearby vehicle by using distributions of movement locations for past nearby vehicles.

According to an embodiment of the present disclosure, a safe and efficient action for an autonomous vehicle planning to turn right to merge into a main road may be determined by observing movements of vehicles around the autonomous vehicle.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of predicting a future trajectory of a current target vehicle by using pieces of movement information about a plurality of past nearby vehicles, the method comprising:

receiving, by a server, the pieces of movement information about the plurality of past nearby vehicles at a reference location of a past driving vehicle;

obtaining, by the server, from the pieces of movement information, movement locations at a second time point at which a preset time period has elapsed from a first time point of the plurality of past nearby vehicles having a first location value at the first time point and movement locations at a time point at which the preset time period has elapsed from the second time point of the plurality of past nearby vehicles having the first location value at the first time point;

generating one or more first clusters by clustering the movement locations at the second time point and one or more second clusters by clustering the movement locations at the time point at which the preset time period has elapsed from the second time point;

generating a plurality of candidate future trajectories by connecting an average point of one of the one or more first clusters with an average point of one of the one or more second clusters; and predicting a future trajectory of the current target vehicle having a location value corresponding to the first location value, based on the plurality of candidate future trajectories, wherein the method further comprises controlling driving of a current driving vehicle based on the predicted future trajectory of the current target vehicle.

2. The method of claim 1, wherein the generating of the plurality of candidate future trajectories further comprises:

receiving second state information at a reference time point about the current target vehicle; and selecting, from among clusters generated by the server, the one or more first clusters and the one or more second clusters that match the second state information about the current target vehicle.

3. The method of claim 2, wherein the second state information about the current target vehicle comprises location values and speed values of the current target vehicles.

4. The method of claim 2, wherein the selecting of the one or more first clusters and the one or more second clusters comprises:

selecting the plurality of past nearby vehicles having the first location value within a preset range from the location value included in the second state information of the current target vehicle, and selecting, from among the clusters generated by the server, the one or more first clusters and one or more second clusters generated for the selected vehicles.

5. The method of claim 1, wherein the movement locations are specified by at least one of a road on which the plurality of past nearby vehicles were driving, and a lane included in the road.

6. The method of claim 1, wherein the generating of one or more first clusters and the one or more second clusters comprises:

generating one or more clusters of the movement locations at the second time point and the time point at which the preset time period has elapsed from the second time point, by using a clustering technique;

approximating each of the one or more first clusters and each of the one or more second clusters as a Gaussian distribution; and obtaining a Gaussian mixture distribution of the movement locations by applying a Gaussian mixture model (GMM) to the one or more first clusters and the one or more second clusters approximated as the Gaussian distributions.

7. The method of claim 6, wherein the clustering technique is density-based spatial clustering of applications with noise (DBSCAN).

8. A non-transitory computer-readable recording medium having recorded thereon a program for executing the method of claim 1 on a computer.

9. A system for predicting a future trajectory of a current target vehicle by using pieces of movement information about a plurality of past nearby vehicles, the system comprising:

a processor in a past driving vehicle, the processor in the past driving vehicle being configured to receive the pieces of movement information about the one or more past nearby vehicles at a reference location of the past driving vehicle;

a server configured to generate one or more first clusters and one or more second clusters by clustering movement locations of the plurality of past nearby vehicles by using the pieces of movement information; and a processor in a current driving vehicle, the processor in the current driving vehicle being configured to predict the future trajectory of the current target vehicle, wherein the server is further configured to receive the pieces of movement information about the plurality of past nearby vehicles at a reference location of a past driving vehicle, obtain, from the pieces of movement information movement locations at a second time point at which a preset time period has elapsed from a first time point of the plurality of past nearby vehicles having a first location value at the first time point and movement locations at a time point at which the preset time period has elapsed from the second time point of the plurality of past nearby vehicles having the first location value at the first time point, and generate one or more first clusters by clustering the movement locations at the second time point and one or more second clusters by clustering the movement locations at the time point at which the preset time period has elapsed from the second time point, wherein the processor in the current driving vehicle is further configured to obtain second state information about the current target vehicle at the reference location and a reference time point, receive, from the server, the one or more first clusters and the one or more second clusters that match the second state information about the current target vehicle, generate a plurality of candidate future trajectories, by connecting an average point of one of the one or more first clusters with an average point of one of the one or more second clusters, predict a future trajectory of the current target vehicle, having a location value corresponding to the first location value, based on the plurality of candidate future trajectories, and control driving of the current driving vehicle based on the predicted future trajectory of the current target vehicle.

10. The system of claim 9, wherein the processor in the current driving vehicle is further configured to obtain a Gaussian mixture distribution of the movement locations, and calculate an average point of the Gaussian mixture distribution, and a probability for each cluster included in the Gaussian mixture distribution.

* * * * *